US012682926B2

(12) United States Patent
Nakao et al.

(10) Patent No.: US 12,682,926 B2
(45) Date of Patent: Jul. 14, 2026

(54) MAGNETIC HEAD, MAGNETIC TAPE, MAGNETIC TAPE CARTRIDGE, MAGNETIC TAPE DRIVE, AND MAGNETIC TAPE SYSTEM

(71) Applicant: FUJIFILM CORPORATION, Tokyo (JP)

(72) Inventors: Toru Nakao, Kanagawa (JP); Yoichi Akano, Kanagawa (JP); Hodaka Suzuki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 19/275,987

(22) Filed: Jul. 22, 2025

(65) Prior Publication Data

US 2025/0349316 A1    Nov. 13, 2025

Related U.S. Application Data

(63) Continuation of application No. PCT/JP2024/001523, filed on Jan. 19, 2024.

(30) Foreign Application Priority Data

Feb. 7, 2023    (JP) ................................. 2023-017162

(51) Int. Cl.
*G11B 5/584* (2006.01)
*G11B 5/008* (2006.01)
*G11B 20/12* (2006.01)
(52) U.S. Cl.
CPC .......... *G11B 5/584* (2013.01); *G11B 5/00813* (2013.01); *G11B 20/1201* (2013.01)
(58) Field of Classification Search
None
See application file for complete search history.

(56) References Cited

U.S. PATENT DOCUMENTS 6,430,008 B1 *  8/2002  Trabert .................. G11B 5/584
7,957,088 B1 *  6/2011  Bui ......................... G11B 5/584
360/76

(Continued)

FOREIGN PATENT DOCUMENTS

JP      2008-217964 A      9/2008
JP      2019-046521 A      3/2019

(Continued)

OTHER PUBLICATIONS

International Search Report issued in International Application No. PCT/JP2024/001523 on Apr. 2, 2024.

(Continued)

*Primary Examiner* — Peter Vincent Agustin
(74) *Attorney, Agent, or Firm* — SOLARIS Intellectual Property Group, PLLC

(57) ABSTRACT

The magnetic head comprises a recording module in which a plurality of recording elements are provided, and a reproducing module in which a plurality of reproducing elements are provided. The recording module and the reproducing module are disposed along a longitudinal direction of the magnetic tape. A pair of first servo reading elements of the recording module and a pair of second servo reading elements of the reproducing module are shifted from each other by a predetermined difference along one direction in the width direction of the magnetic tape. The predetermined difference is defined based on a pitch between a plurality of tracks formed using an SMR method and a length of the recording element in the width direction of the magnetic tape.

12 Claims, 18 Drawing Sheets

(56)                   References Cited

U.S. PATENT DOCUMENTS

| | | | |
|---|---|---|---|
| 2008/0068750 A1* | 3/2008 | Biskeborn ................ G11B 5/29 |
| 2008/0278844 A1 | 11/2008 | Kawakami et al. |
| 2010/0002338 A1 | 1/2010 | Kawakami et al. |
| 2010/0226039 A1* | 9/2010 | Bui ........................ G11B 5/584 |
| | | | 360/77.12 |
| 2014/0204483 A1* | 7/2014 | Cherubini .......... G11B 5/00847 |
| | | | 360/78.02 |
| 2014/0334033 A1* | 11/2014 | Biskeborn .......... G11B 5/00826 |
| | | | 360/134 |
| 2015/0154984 A1* | 6/2015 | Biskeborn .......... G11B 5/00891 |
| | | | 360/63 |
| 2015/0162037 A1* | 6/2015 | Cherubini .......... G11B 5/00813 |
| | | | 360/48 |
| 2018/0286456 A1* | 10/2018 | Biskeborn ................ G11B 5/40 |
| 2019/0074031 A1 | 3/2019 | Akano |
| 2019/0279673 A1 | 9/2019 | Biskeborn et al. |
| 2021/0065741 A1* | 3/2021 | Nakao .................... G11B 5/265 |
| 2021/0082462 A1 | 3/2021 | Bradshaw |

| | | | |
|---|---|---|---|
| 2021/0082466 A1 | 3/2021 | Bradshaw |
| 2021/0090597 A1 | 3/2021 | Akano |
| 2021/0151078 A1 | 5/2021 | Bradshaw |
| 2023/0238032 A1 | 7/2023 | Kaneko |
| 2023/0267964 A1* | 8/2023 | Biskeborn .............. G11B 5/584 |
| 2024/0161775 A1* | 5/2024 | Morita ................... G11B 5/584 |
| 2024/0379118 A1* | 11/2024 | Nakao ................ G11B 5/00813 |
| 2024/0386911 A1* | 11/2024 | Sekiguchi ............ G11B 5/5504 |
| 2025/0349316 A1* | 11/2025 | Nakao .................... G11B 21/10 |

FOREIGN PATENT DOCUMENTS

| | | | |
|---|---|---|---|
| JP | 2022-057517 A | 4/2022 |
| JP | 2022-547963 A | 11/2022 |

OTHER PUBLICATIONS

Written Opinion of the ISA issued in International Application No. PCT/JP2024/001523 on Apr. 2, 2024.

\* cited by examiner

MAGNETIC HEAD, MAGNETIC TAPE, MAGNETIC TAPE CARTRIDGE, MAGNETIC TAPE DRIVE, AND MAGNETIC TAPE SYSTEM

CROSS-REFERENCE TO RELATED APPLICATIONS

This application is a continuation application of International Application No. PCT/JP2024/001523, filed Jan. 19, 2024, the disclosure of which is incorporated herein by reference in its entirety. Further, this application claims priority from Japanese Patent Application No. 2023-017162, filed Feb. 7, 2023, the disclosure of which is incorporated herein by reference in its entirety.

BACKGROUND

1. Technical Field

The technology of the present disclosure relates to a magnetic head, a magnetic tape, a magnetic tape cartridge, a magnetic tape drive, and a magnetic tape system.

2. Related Art

JP2022-057517A discloses a magnetic tape including a timing-based servo pattern, in which the magnetic tape is used in a magnetic tape device in which a total number of data tracks is 8705 or more in conversion of a magnetic tape having a width of ½ inch, ΔPNL of the timing-based servo pattern is 10.0% or less of a track pitch, and ΔPNL indicates a shift amount from linearity of the timing-based servo pattern.

JP2019-046521A discloses a recording device comprising a recording unit that records information on linearity of a servo signal recorded onto a magnetic tape included in a recording tape cartridge, on a recording medium included in the recording tape cartridge.

WO 2019/0279673A discloses a shingled magnetic recording method as a method of recording data on a magnetic tape.

SUMMARY

One embodiment according to the technology of the present disclosure provides a magnetic head, a magnetic tape drive, a magnetic tape, a magnetic tape cartridge, and a magnetic tape system capable of aligning a reading position of a servo pattern read by a servo reading element with a reading position of the servo pattern during reproduction of data, in a case in which data is recorded on a magnetic tape by a shingled magnetic recording (SMR) method.

A first aspect according to the technology of the present disclosure relates to a magnetic head provided with a plurality of servo reading elements corresponding to a plurality of servo bands in which a plurality of servo patterns are recorded along a longitudinal direction of a magnetic tape and performing recording of data on the magnetic tape and reproducing of the data from the magnetic tape, the magnetic head comprising:

a recording module in which a plurality of recording elements are provided between a pair of first servo reading elements adjacent to each other in a width direction of the magnetic tape among the plurality of servo reading elements; and a reproducing module in which a plurality of reproducing elements are provided between a pair of second servo reading elements adjacent to each other in the width direction among the plurality of servo reading elements, in which the recording module and the reproducing module are disposed along the longitudinal direction, the pair of first servo reading elements and the pair of second servo reading elements are shifted from each other by a predetermined difference in one direction of the width direction, and the predetermined difference is defined based on a pitch between a plurality of tracks formed by recording the data on the magnetic tape by the recording element using an SMR method and a length of the recording element in the width direction.

A second aspect according to the technology of the present disclosure relates to the magnetic head according to the first aspect, in which a center position of the recording element aligns with a center position of the reproducing element in the width direction in the magnetic head on the magnetic tape.

A third aspect according to the technology of the present disclosure relates to the magnetic head according to the first aspect or the second aspect, in which a first length that is a length of the recording element in the width direction is longer than a second length that is a length of the reproducing element in the width direction, and the second length is equal to or shorter than the pitch.

A fourth aspect according to the technology of the present disclosure relates to the magnetic head according to the third aspect, in which the first length is equal to or longer than twice the pitch, and the second length is equal to or shorter than half the pitch.

A fifth aspect according to the technology of the present disclosure relates to the magnetic head according to any one of the first to fourth aspects, in which the one direction is a direction in which the data is shifted on the magnetic tape by recording the data on the magnetic tape using the SMR method.

A sixth aspect according to the technology of the present disclosure is the magnetic head according to any one of the first to fifth aspects, in which the predetermined difference is longer than the pitch.

A seventh aspect according to the technology of the present disclosure relates to the magnetic head according to any one of the first to sixth aspects, in which one recording module is disposed on each of both sides of the reproducing module in the longitudinal direction.

An eighth aspect according to the technology of the present disclosure relates to the magnetic head according to any one of the first to seventh aspects, in which the recording module and the reproducing module are disposed in a posture inclined with respect to the width direction along a recording surface of the magnetic tape.

A ninth aspect according to the technology of the present disclosure relates to a magnetic tape drive comprising:

the magnetic head according to any one of the first to eighth aspects; and a processor that controls the magnetic head.

A tenth aspect according to the technology of the present disclosure is a magnetic tape comprising:

a plurality of servo patterns read by the plurality of servo reading elements included in the magnetic head according to any one of claims 1 to 8; and a plurality of tracks formed by recording the data by the recording element included in the magnetic head using an SMR method, based on a reading result of the plurality of servo patterns by the plurality of servo reading elements, wherein the data is reproduced from the track by the reproducing element included in the magnetic head based on the reading result.

An eleventh aspect according to the technology of the present disclosure relates to a magnetic tape cartridge comprising:

the magnetic tape according to the tenth aspect; and a case in which the magnetic tape is accommodated.

A twelfth aspect according to the technology of the present disclosure relates to a magnetic tape system comprising:

a magnetic tape drive including the magnetic head according to any one of the first to eighth aspects and a processor that controls the magnetic head; and a magnetic tape including a plurality of servo patterns read by the plurality of servo reading elements included in the magnetic head and a plurality of tracks formed by recording the data by the recording elements included in the magnetic head using an SMR method, based on a reading result of the plurality of servo patterns by the plurality of servo reading elements, and in which the data is reproduced from the track by the reproducing element included in the magnetic head based on the reading result.

BRIEF DESCRIPTION OF THE DRAWINGS

Exemplary embodiments according to the technique of the present disclosure will be described in detail based on the following figures, wherein:

FIG. 7 is a conceptual diagram showing an example of a configuration of a data band formed on a front surface of the magnetic tape;

DETAILED DESCRIPTION

Hereinafter, examples of embodiments of a magnetic head, a magnetic tape drive, a magnetic tape, a magnetic tape cartridge, and a magnetic tape system according to the technology of the present disclosure will be described with reference to the accompanying drawings.

First, terms used in the following description will be described.

CPU refers to an abbreviation stands for "Central Processing Unit". RAM refers to an abbreviation stands for "Random access memory". NVM refers to an abbreviation for "Non-volatile memory". EEPROM refers to an abbreviation for "Electrically erasable and programmable read only memory". SSD refers to an abbreviation for "Solid state drive". HDD refers to an abbreviation for "Hard disk drive". ASIC refers to an abbreviation for "Application specific integrated circuit". PLD refers to an abbreviation for "Programmable logic device". FPGA refers to an abbreviation stands for "Field-programmable gate array". SoC refers to an abbreviation of a "System-on-chip". IC refers to an abbreviation of an "Integrated circuit". RFID refers to the abbreviation for "Radio frequency identifier". UI refers to an abbreviation for "User interface". SMR refers to an abbreviation of "Shingled Magnetic Recording". TDS refers to an abbreviation of "Transverse dimensional stability".

Figure 1:
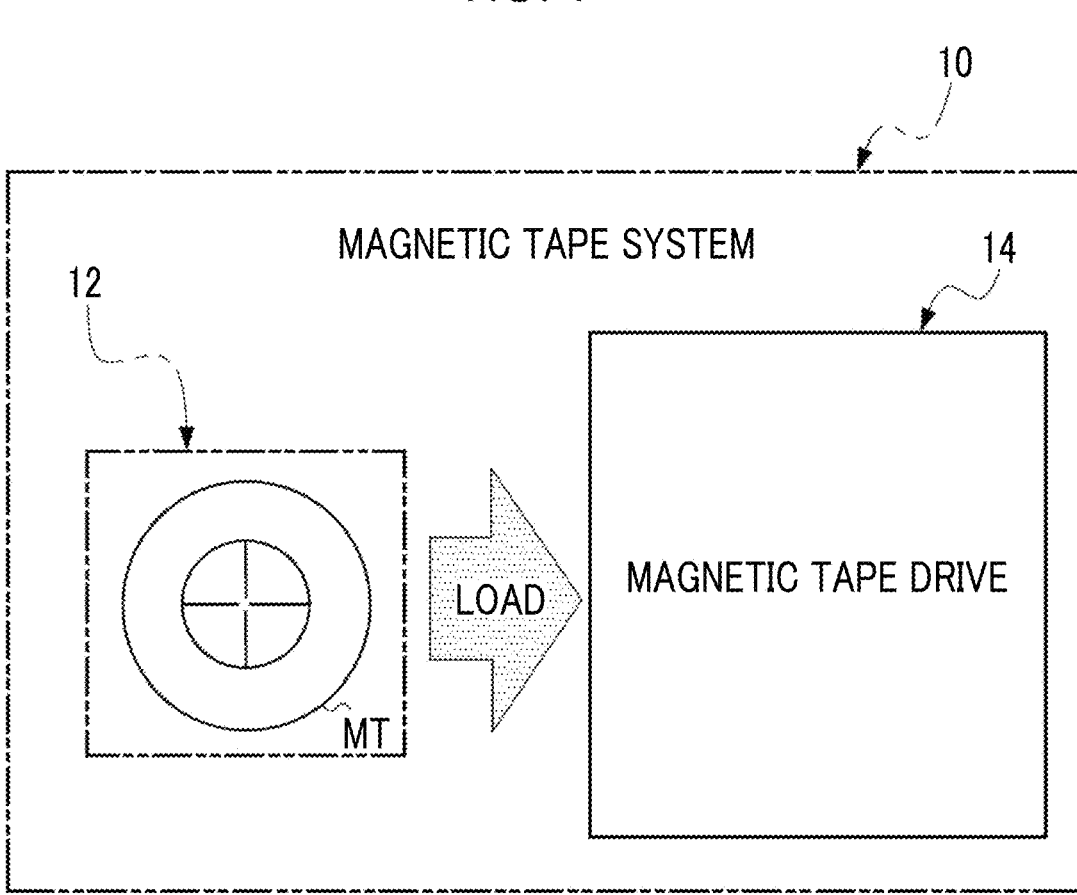
FIG. 1 is a conceptual diagram showing an example of a configuration of a magnetic tape system.

As shown in FIG. 1 as an example, a magnetic tape system 10 comprises a magnetic tape cartridge 12 and a magnetic tape drive 14. The magnetic tape drive 14 is loaded with the magnetic tape cartridge 12. The magnetic tape cartridge 12 accommodates a magnetic tape MT. The magnetic tape drive 14 extracts the magnetic tape MT from the loaded magnetic tape cartridge 12, and records data onto the magnetic tape MT or reads data from the magnetic tape MT while the extracted magnetic tape MT is traveling.

In the present embodiment, the magnetic tape system 10 is an example of a "magnetic tape system" according to the technology of the present disclosure. In addition, in the present embodiment, the magnetic tape MT is an example of a "magnetic tape" according to the technology of the present disclosure. In addition, in the present embodiment, the magnetic tape drive 14 is an example of a "magnetic tape drive" according to the technology of the present disclosure. In addition, in the present embodiment, the magnetic tape cartridge 12 is an example of a "magnetic tape cartridge" according to the technology of the present disclosure.

Next, an example of a configuration of the magnetic tape cartridge 12 will be described with reference to FIGS. 2 to 4. In the following description, for convenience of description, in FIGS. 2 to 4, a direction of loading the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the description of the structure to be shown below, "front" refers to the front side of the magnetic tape cartridge 12.

In addition, in the following description, for convenience of description, in FIGS. 2 to 4, a direction of an arrow B that is perpendicular to the direction of the arrow A is defined as a right direction, and a side of the magnetic tape cartridge 12 in the right direction is defined as a right side of the magnetic tape cartridge 12. In the description of the structure to be shown below, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the description of the structure to be shown below, "left" refers to the left side of the magnetic tape cartridge 12.

In addition, in the following description, for convenience of description, in FIGS. 2 to 4, a direction perpendicular to the direction of the arrow A and to the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the description of the structure to be shown below, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the description of the structure to be shown below, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the description of the structure to be shown below, "lower" refers to the lower side of the magnetic tape cartridge 12.

Figure 2:
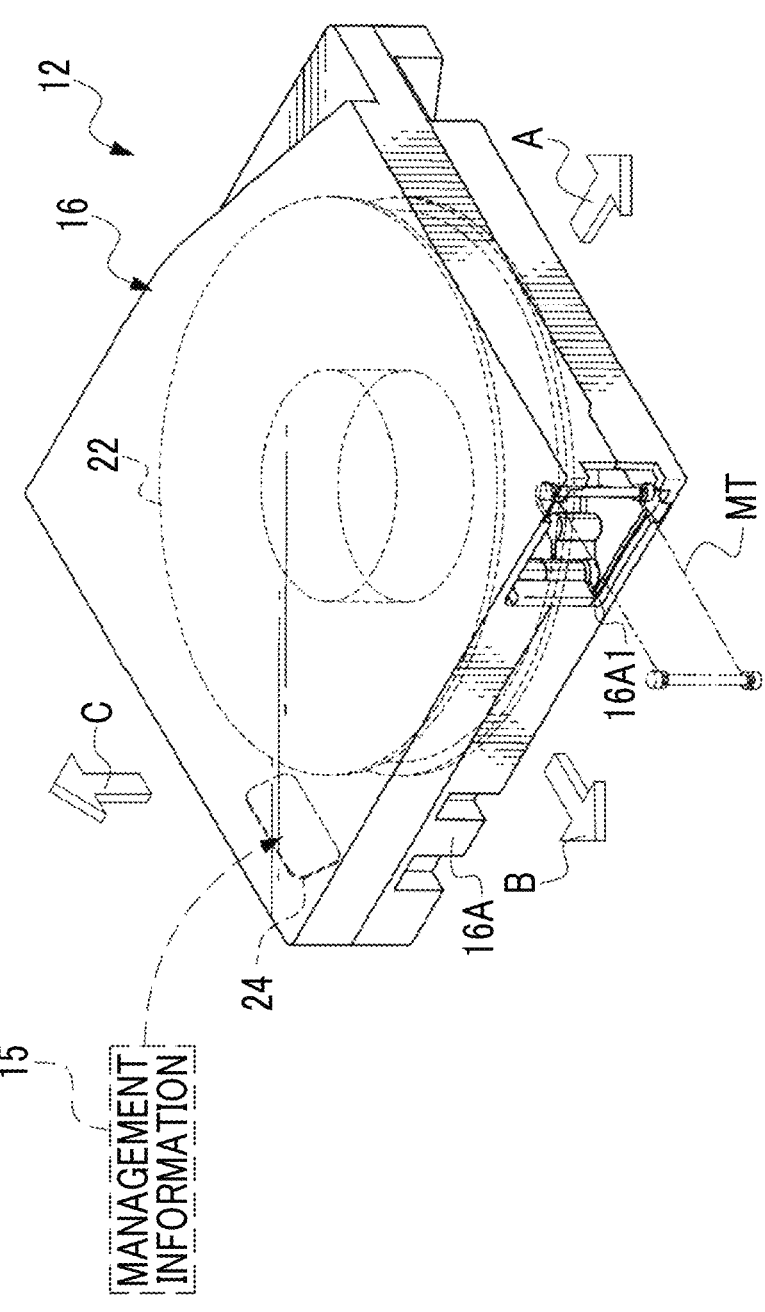
FIG. 2 is a schematic perspective view showing an example of an appearance of a magnetic tape cartridge.

As shown in FIG. 2 as an example, the magnetic tape cartridge 12 has a substantially rectangular shape in a plan view and comprises a box-like case 16. The magnetic tape MT is accommodated in the case 16. The case 16 is an example of a "case" according to the technology of the present disclosure.

A sending reel 22 is rotatably accommodated inside the case 16. The magnetic tape MT is wound around the sending reel 22. An opening 16A1 is formed on the front side of a right wall 16A of the case 16. The magnetic tape MT is extracted from the opening 16A1.

In the case 16, a cartridge memory 24 is accommodated as a storage medium other than the magnetic tape MT. An IC chip having an NVM is mounted in the cartridge memory 24. In the present embodiment, a so-called passive type RFID tag is employed as the cartridge memory 24, and reading and writing of various kinds of information (that is, storage and acquisition of the various kinds of information) are performed with respect to the cartridge memory 24 in a non-contact manner.

In the cartridge memory 24, management information 15 for managing the magnetic tape cartridge 12 is stored. The management information 15 includes, for example, information on the cartridge memory 24, information on the magnetic tape MT, information on the magnetic tape drive 14, and the like.

Figure 3:
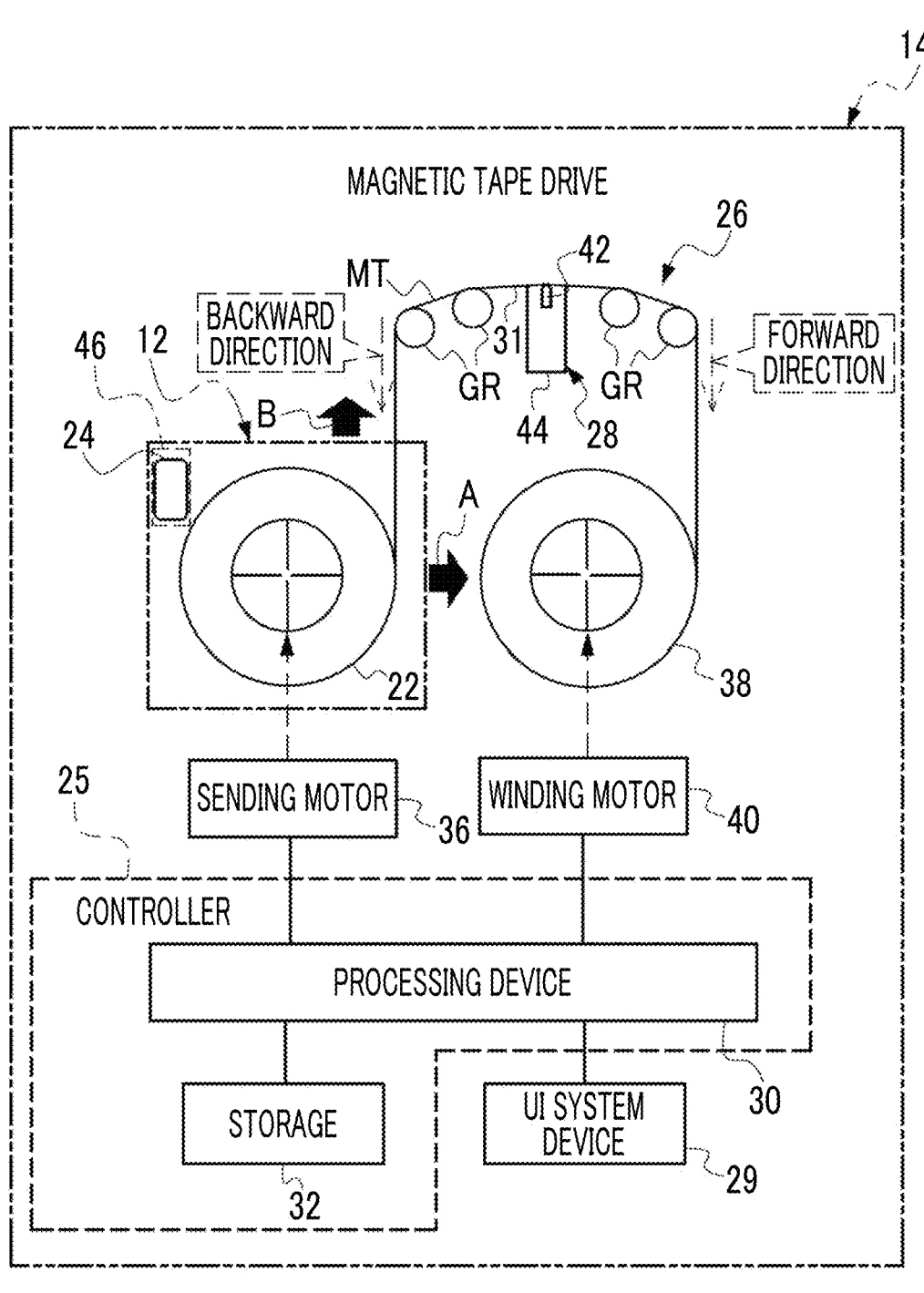
FIG. 3 is a schematic configuration diagram showing an example of a hardware configuration of a magnetic tape drive.

As shown in FIG. 3 as an example, the magnetic tape drive 14 comprises a controller 25, a transport device 26, a magnetic head 28, and a UI system device 29. The controller 25 comprises a processing device 30 and a storage 32. The processing device 30 is an example of a "processor" according to the technology of the present disclosure. The magnetic head 28 is an example of a "magnetic head" according to the technology of the present disclosure.

The magnetic tape cartridge 12 is loaded into the magnetic tape drive 14 along the direction of the arrow A. In the magnetic tape drive 14, the magnetic tape MT is extracted from the magnetic tape cartridge 12 and used. The magnetic tape drive 14 uses the management information 15 or the like stored in the cartridge memory 24 to control each unit provided in the magnetic tape cartridge 12 and the magnetic tape drive 14.

The magnetic tape drive 14 performs magnetic processing on a front surface 31 of the magnetic tape MT by using the magnetic head 28 in a state in which the magnetic tape MT is traveling. The front surface 31 is a recording surface where data is recorded. The magnetic processing refers to a recording processing in which the magnetic head 28 records data onto the front surface 31 of the magnetic tape MT and a reproducing processing (that is, processing of reading data) in which the magnetic head 28 reproduces data from the front surface 31 of the magnetic tape MT. In the present embodiment, the magnetic tape drive 14 selectively performs the recording processing and the reproducing processing by using the magnetic head 28. That is, the magnetic tape drive 14 extracts the magnetic tape MT from the magnetic tape cartridge 12, and records data onto the front surface 31 of the extracted magnetic tape MT by using the magnetic head 28 or reproduces data from the front surface 31 of the extracted magnetic tape MT by using the magnetic head 28. The front surface 31 is an example of a "recording surface" according to the technology of the present disclosure.

The processing device 30 controls entirety of the magnetic tape drive 14. In the present embodiment, although the processing device 30 is realized by an ASIC, the technology of the present disclosure is not limited thereto. For example, the processing device 30 may be realized by an FPGA and/or a PLD. In addition, the processing device 30 may be realized by a computer including a CPU, a flash memory (for example, an EEPROM, an SSD, and/or the like), and a RAM. In addition, the processing device 30 may be realized by combining two or more of an ASIC, an FPGA, a PLD, and a computer. That is, the processing device 30 may be realized by a combination of a hardware configuration and a software configuration.

The storage 32 is connected to the processing device 30, and the processing device 30 performs writing of various kinds of information to the storage 32 and reading of various kinds of information from the storage 32. An example of the storage 32 includes a flash memory and/or an HDD. The flash memory and the HDD are merely examples, and any memory may be used as long as the memory is a non-volatile memory that can be mounted in the magnetic tape drive 14.

The UI system device 29 is a device having an acceptance function of accepting an instruction signal indicating an instruction from a user, and a presentation function of presenting information to the user. The acceptance function is implemented by, for example, a touch panel, a hard key (for example, a keyboard), and/or a mouse. The presentation function is implemented by, for example, a display, a printer, and/or a speaker. The UI system device 29 is connected to the processing device 30. The processing device 30 acquires the instruction signal accepted by the UI system device 29. The UI system device 29 presents various kinds of information to the user, under the control of the processing device 30.

The transport device 26 is a device that selectively transports the magnetic tape MT along a predetermined path in a forward direction and a backward direction, and comprises a sending motor 36, a winding reel 38, a winding motor 40, and a plurality of guide rollers GR. Here, the forward direction refers to a feeding direction of the magnetic tape MT, and the backward direction refers to a rewinding direction of the magnetic tape MT.

The sending motor 36 rotates the sending reel 22 provided in the magnetic tape cartridge 12, under the control of the processing device 30. The processing device 30 controls the sending motor 36 to control a rotation direction, a rotation speed, a rotation torque, and the like of the sending reel 22.

The winding motor 40 rotates the winding reel 38, under the control of the processing device 30. The processing device 30 controls the winding motor 40 to control a rotation direction, a rotation speed, a rotation torque, and the like of the winding reel 38.

In a case in which the magnetic tape MT is to be wound onto the winding reel 38, the processing device 30 rotates the sending motor 36 and the winding motor 40 such that the magnetic tape MT travels along the predetermined path in the forward direction. The rotation speeds, the rotation torques, and the like of the sending motor 36 and the winding motor 40 are adjusted according to a speed at which the magnetic tape MT is wound onto the winding reel 38. In addition, by adjusting the rotation speed, the rotation torque, and the like of each of the sending motor 36 and the winding motor 40 through the processing device 30, tension is applied to the magnetic tape MT. Additionally, the tension applied to the magnetic tape MT is controlled by adjusting the rotation speed, the rotation torque, and the like of each of the sending motor 36 and the winding motor 40 through the processing device 30.

In a case in which the magnetic tape MT is to be rewound onto the sending reel 22, the processing device 30 rotates the sending motor 36 and the winding motor 40 such that the magnetic tape MT travels along the predetermined path in the backward direction.

Each of the plurality of guide rollers GR is a roller that guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 so as to come into contact with the traveling magnetic tape MT. The magnetic element unit 42 includes a plurality of magnetic elements.

The magnetic element unit 42 records data onto the magnetic tape MT transported by the transport device 26 or reproduces data from the magnetic tape MT transported by the transport device 26. Here, the data refers to, for example, a servo pattern 52 (see FIG. 6) and data other than the servo pattern 52, that is, data recorded in a data band DB (see FIG. 6).

The magnetic tape drive 14 comprises a noncontact reading/writing device 46. The noncontact reading/writing device 46 is disposed to confront a back surface of the cartridge memory 24 on the lower side of the magnetic tape cartridge 12 in a state in which the magnetic tape cartridge 12 is loaded, and performs reading and writing of information with respect to the cartridge memory 24 in a non-contact manner.

Figure 4:
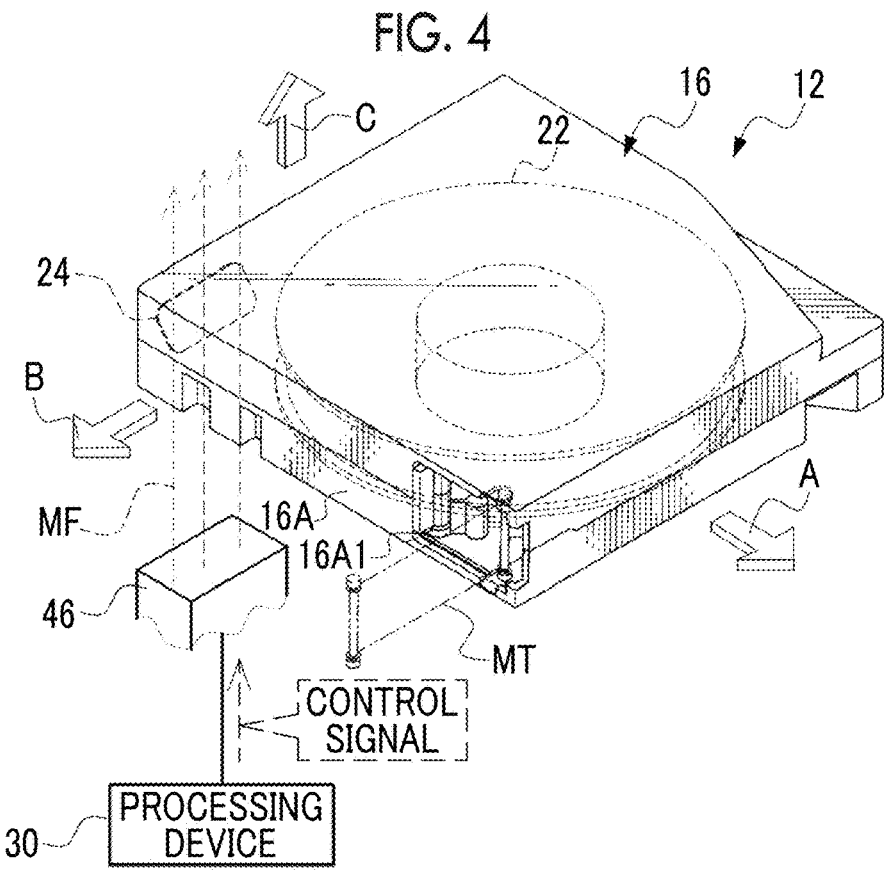
FIG. 4 is a schematic perspective view showing an example of an aspect in which a magnetic field is released by a noncontact reading/writing device from a lower side of the magnetic tape cartridge.

As shown in FIG. 4 as an example, the noncontact reading/writing device 46 releases a magnetic field MF from the lower side of the magnetic tape cartridge 12 toward the cartridge memory 24. The magnetic field MF passes through the cartridge memory 24.

The noncontact reading/writing device 46 is connected to the processing device 30. The processing device 30 outputs a control signal to the noncontact reading/writing device 46. The control signal is a signal for controlling the cartridge memory 24. The noncontact reading/writing device 46 generates the magnetic field MF in response to the control signal input from the processing device 30, and releases the generated magnetic field MF toward the cartridge memory 24.

The noncontact reading/writing device 46 performs processing on the cartridge memory 24 in response to the control signal by performing noncontact communication with the cartridge memory 24 via the magnetic field MF. For example, the noncontact reading/writing device 46 selectively performs, under the control of the processing device 30, processing of reading the information from the cartridge memory 24 and processing of storing the information in the cartridge memory 24 (that is, processing of writing the information to the cartridge memory 24). In other words, the processing device 30 reads the information from the cartridge memory 24 and stores the information in the cartridge memory 24 by performing communication with the cartridge memory 24 via the noncontact reading/writing device 46 in a non-contact manner.

Figure 5:
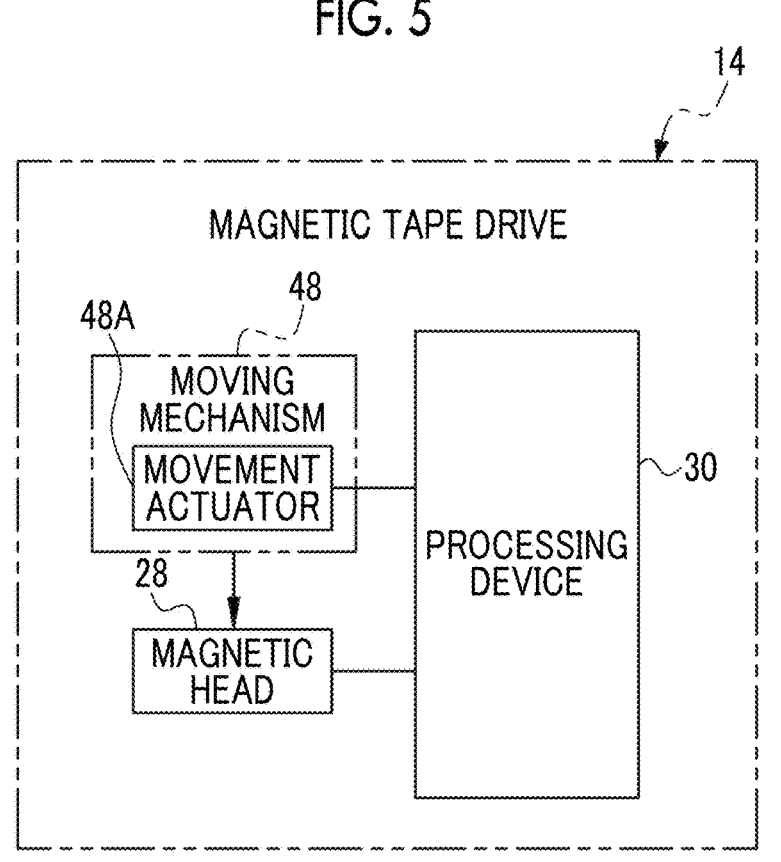
FIG. 5 is a conceptual diagram showing an example of a correlation between a processing device, a moving mechanism, and a magnetic head.

As shown in FIG. 5 as an example, the processing device 30 is connected to the magnetic head 28 and controls processing using the magnetic field MF (see FIG. 4) by the magnetic head 28 (for example, the above-mentioned magnetic processing). The magnetic tape drive 14 comprises a moving mechanism 48. The processing device 30 is connected to the magnetic head 28 via the moving mechanism 48. The processing device 30 controls the movement of the magnetic head 28 via the moving mechanism 48 (for example, the movement of the magnetic tape MT in the width direction WD (see FIG. 6)).

The moving mechanism 48 includes a movement actuator 48A. Examples of the movement actuator 48A include a voice coil motor and/or a piezo actuator. The movement actuator 48A is connected to the processing device 30, and the processing device 30 controls the movement actuator 48A. The movement actuator 48A generates power under the control of the processing device 30. The moving mechanism 48 moves the magnetic head 28 in a width direction WD (see FIG. 6) of the magnetic tape MT by receiving the power generated by the movement actuator 48A.

Figure 6:
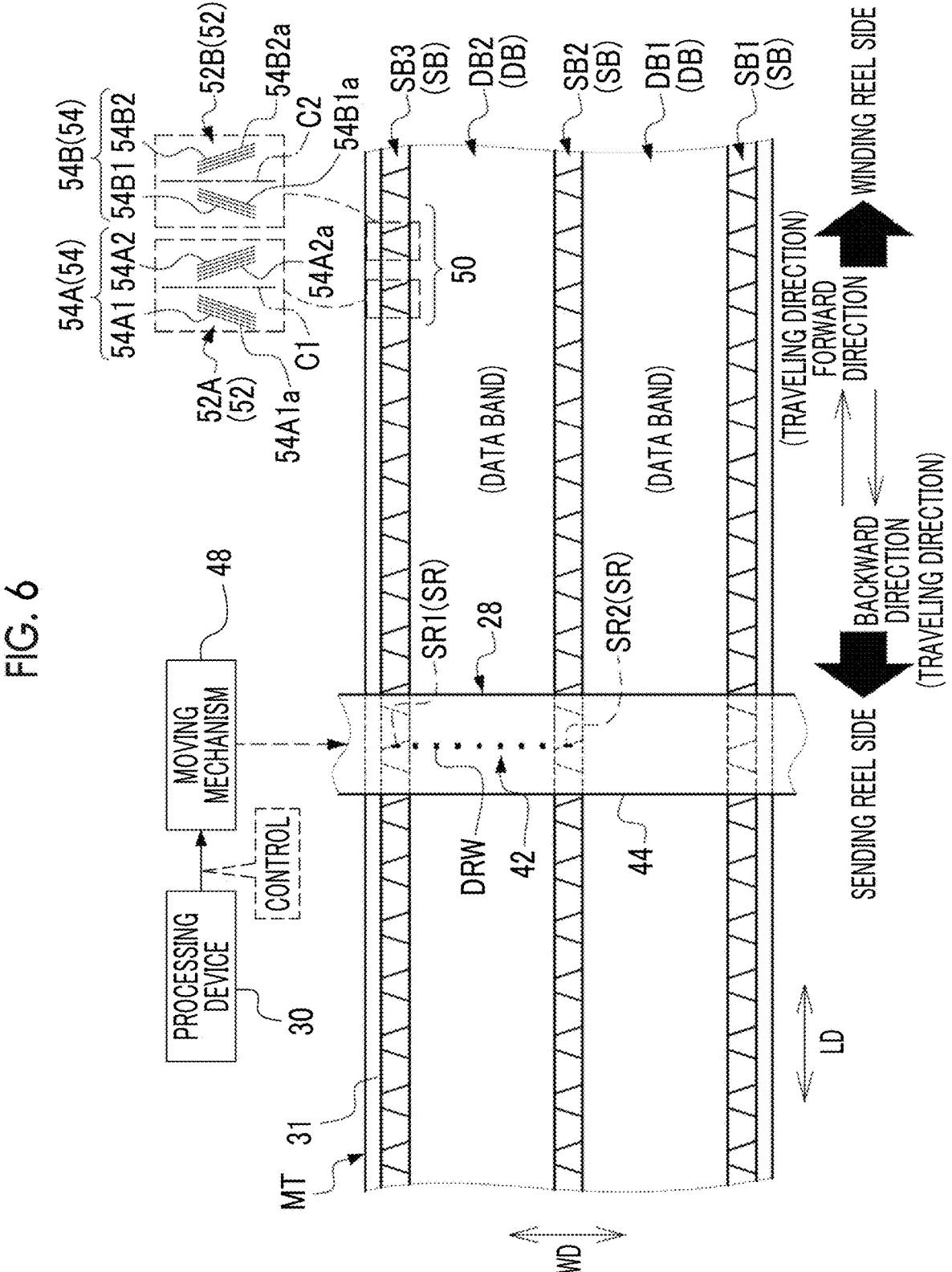
FIG. 6 is a conceptual diagram showing an example of an aspect in which a state in which the magnetic head is positioned on the magnetic tape is observed from a front surface side of the magnetic tape.

As shown in FIG. 6 as an example, on the front surface 31 of the magnetic tape MT, servo bands SB1, SB2, and SB3 and data bands DB1 and DB2 are formed. In the present embodiment, the servo bands SB1, SB2, and SB3 are examples of a "plurality of servo bands" according to the technology of the present disclosure. In the following, for convenience of description, in a case in which the distinction is not specifically needed, the servo bands SB1 to SB3 are referred to as a "servo band SB" and the data bands DB1 and DB2 are referred to as a "data band DB".

The servo bands SB1 to SB3 and the data bands DB1 and DB2 are formed along the longitudinal direction LD (that is, a total length direction) of the magnetic tape MT. Here, the longitudinal direction LD refers to the traveling direction of the magnetic tape MT, in other words. The traveling direction of the magnetic tape MT is defined in two directions of the forward direction which is a direction in which the magnetic tape MT travels from the sending reel 22 side to the winding reel 38 side (hereinafter, also simply referred to as a "forward direction"), and the backward direction which is a direction in which the magnetic tape MT travels from the winding reel 38 side to the sending reel 22 side (hereinafter, also simply referred to as a "backward direction"). In the present embodiment, the longitudinal direction LD is an example of a "longitudinal direction of the magnetic tape" according to the technology of the present disclosure.

The servo bands SB1 to SB3 are arranged at positions spaced in the width direction WD of the magnetic tape MT (hereinafter, also simply referred to as a "width direction WD"). For example, the servo bands SB1 to SB3 are arranged at equal intervals along the width direction WD. In the present embodiment, the term "equal intervals" refers to equal intervals in the sense of including, in addition to a completely equal interval, an error that is generally acceptable in the technical field to which the technology of the present disclosure belongs, and that does not contradict the purpose of the technology of the present disclosure. In addition, in the present embodiment, the width direction WD is an example of a "width direction of the magnetic tape" according to the technology of the present disclosure.

The data band DB1 is disposed between the servo band SB1 and the servo band SB2, and the data band DB2 is disposed between the servo band SB2 and the servo band SB3. That is, the servo bands SB and the data bands DB are arranged alternately along the width direction WD.

In the example shown in FIG. 6, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are recorded in the servo band SB along the longitudinal direction LD. The servo patterns 52 are classified into a servo pattern 52A and a servo pattern 52B. The plurality of servo patterns 52 are disposed at regular intervals along the longitudinal direction LD. In the present embodiment, the term "regular" refers to the regularity in the sense of including, in addition to the exact regularity, an error that is generally acceptable in the technical field to which the technology of the present disclosure belongs, and that does not contradict the purpose of the technology of the present disclosure.

The servo band SB is divided by a plurality of frames 50 along the longitudinal direction LD. The frame 50 is defined by a set of servo patterns 52. In the example shown in FIG. 6, the servo patterns 52A and 52B are shown as an example of the set of servo patterns 52. The servo patterns 52A and 52B are adjacent to each other along the longitudinal direction LD, and the servo pattern 52A is positioned on the upstream side in the forward direction, and the servo pattern 52B is positioned on the downstream side in the forward direction in the frame 50.

The servo pattern 52 consists of linear magnetization region pairs 54. The linear magnetization region pair 54 is classified into a linear magnetization region pair 54A and a linear magnetization region pair 54B.

The servo pattern 52A consists of the linear magnetization region pair 54A. In the example shown in FIG. 6, a pair of linear magnetization regions 54A1 and 54A2 is shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side with the imaginary straight line C1 as a symmetry axis.

The linear magnetization region 54A1 is a set of magnetization straight lines 54A1a, which are five magnetized straight lines. The linear magnetization region 54A2 is a set of magnetization straight lines 54A2a, which are five magnetized straight lines.

The servo pattern 52B consists of the linear magnetization region pair 54B. In the example shown in FIG. 6, a pair of linear magnetization regions 54B1 and 54B2 is shown as an example of the linear magnetization region pair 54B. Each of the linear magnetization regions 54B1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side with the imaginary straight line C2 as a symmetry axis.

The linear magnetization region 54B1 is a set of magnetization straight lines 54B1a, which are four magnetized straight lines. The linear magnetization region 54B2 is a set of magnetization straight lines 54B2a, which are four magnetized straight lines.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged linearly along the longitudinal direction of the holder 44. The magnetic element unit 42 has a pair of servo reading elements SR and a plurality of data recording/reproducing elements DRW, as a plurality of magnetic elements.

A length of the holder 44 in the longitudinal direction is sufficiently long with respect to the width of the magnetic tape MT. For example, the length of the holder 44 in the longitudinal direction is set to a length exceeding the width of the magnetic tape MT even in a case in which the magnetic element unit 42 is disposed at any position on the magnetic tape MT.

The pair of servo reading elements SR is mounted on the magnetic head 28. In the magnetic head 28, a relative positional relationship between the holder 44 and the pair of servo reading elements SR is fixed. The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB3, and the servo reading element SR2 is provided at a position corresponding to the servo band SB2. In the present embodiment, the servo reading elements SR1 and SR2 are an example of a "plurality of servo reading elements" according to the technology of the present disclosure.

The plurality of data recording/reproducing elements DRW are disposed linearly between the servo reading element SR1 and the servo reading element SR2. The plurality of data recording/reproducing elements DRW are disposed at intervals along the longitudinal direction of the magnetic head 28 (for example, are disposed at equal intervals along the longitudinal direction of the magnetic head 28). In the example shown in FIG. 6, the longitudinal direction of the magnetic head 28 aligns with the width direction WD. In addition, in the example shown in FIG. 6, the plurality of data recording/reproducing elements DRW are provided at positions corresponding to the data band DB2.

The processing device 30 acquires a servo pattern signal which is a result of reading the servo pattern 52 by the servo reading element SR, and performs a servo control in response to the acquired servo pattern signal. Here, the servo control refers to a control of moving the magnetic head 28 in the width direction WD of the magnetic tape MT by operating the moving mechanism 48 in accordance with the servo pattern 52 read by the servo reading element SR.

By performing the servo control, the plurality of data recording/reproducing elements DRW are positioned on a designated region in the data band DB, and perform the magnetic processing on the designated region in the data band DB in this state. In the example shown in FIG. 6, the plurality of data recording/reproducing elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the processing device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB2 and moves the servo reading element SR2 to the position corresponding to the servo band SB1. As a result, the positions of the plurality of data recording/reproducing elements DRW are changed from on the data band DB2 to on the data band DB1, and the plurality of data recording/reproducing elements DRW perform the magnetic processing on the data band DB1.

Figure 7:
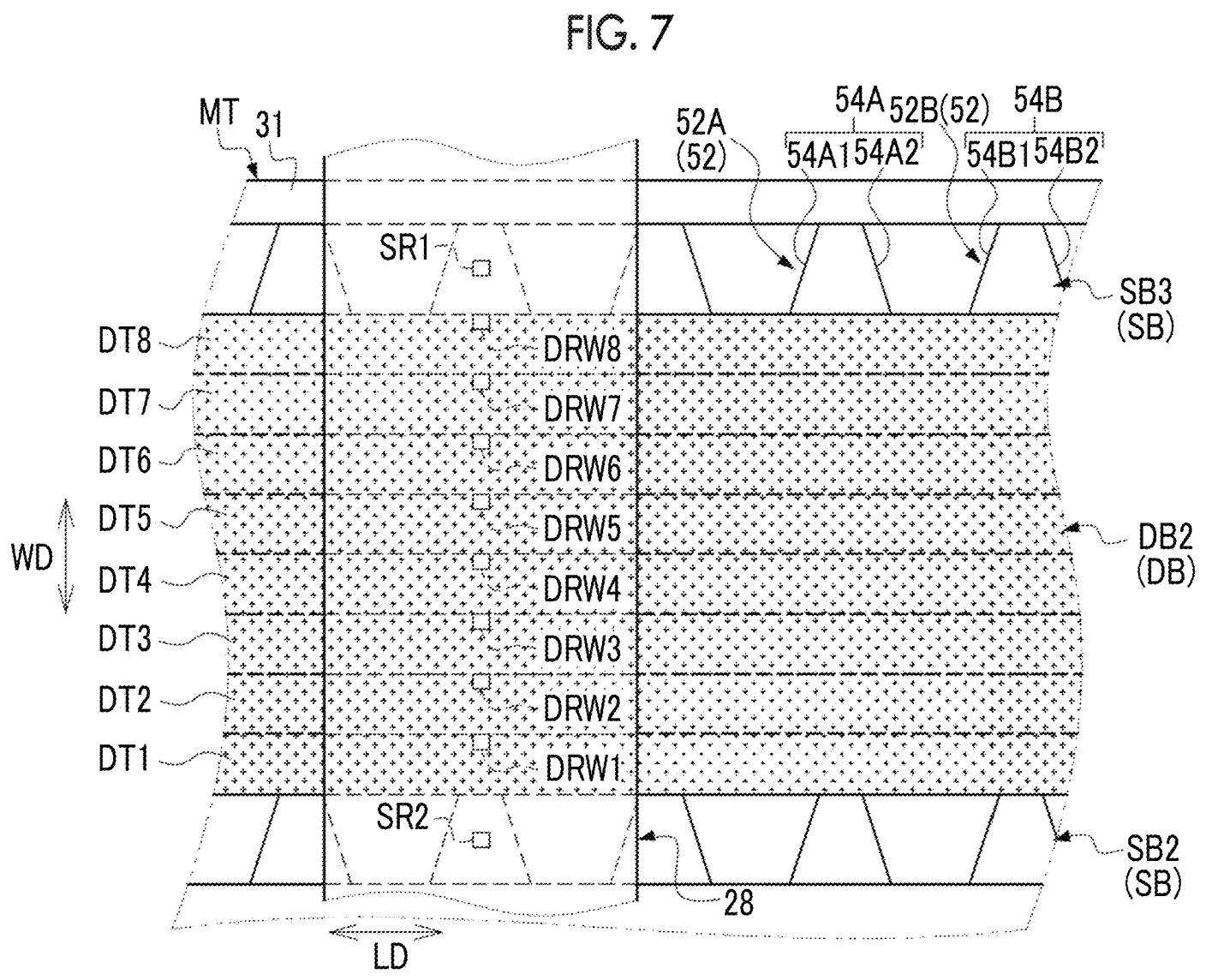

As shown in FIG. 7 as an example, in the data band DB2, as a plurality of divided areas obtained by dividing the data band DB2 in the width direction WD, data tracks DT1, DT2, DT3, DT4, DT5, DT6, DT7, and DT8 are formed from the servo band SB2 side to the servo band SB3 side.

The magnetic head 28 includes, as the plurality of data recording/reproducing elements DRW, data recording/reproducing elements DRW1, DRW2, DRW3, DRW4, DRW5, DRW6, DRW7, and DRW8 between the servo reading element SR1 and the servo reading element SR2 along the width direction WD. The data recording/reproducing elements DRW1 to DRW8 have a one-to-one correspondence with the data tracks DT1 to DT8, and can reproduce (that is, read) data from the data tracks DT1 to DT8 and record (that is, write) the data on the data tracks DT1 to DT8.

Hereinafter, in a case in which the distinction is not specifically needed, the data tracks DT1, DT2, DT3, DT4, DT5, DT6, DT7, and DT8 are referred to as a "data track DT". In addition, in the following, in a case in which the distinction is not specifically needed, the data recording/reproducing elements DRW1, DRW2, DRW3, DRW4, DRW5, DRW6, DRW7, and DRW8 are referred to as a "data recording/reproducing element DRW".

In addition, although not shown, a plurality of data tracks DT corresponding to the data tracks DT1, DT2, DT3, DT4, DT5, DT6, DT7, and DT8 are also formed in the data band DB1 (see FIG. 6).

Figure 8:
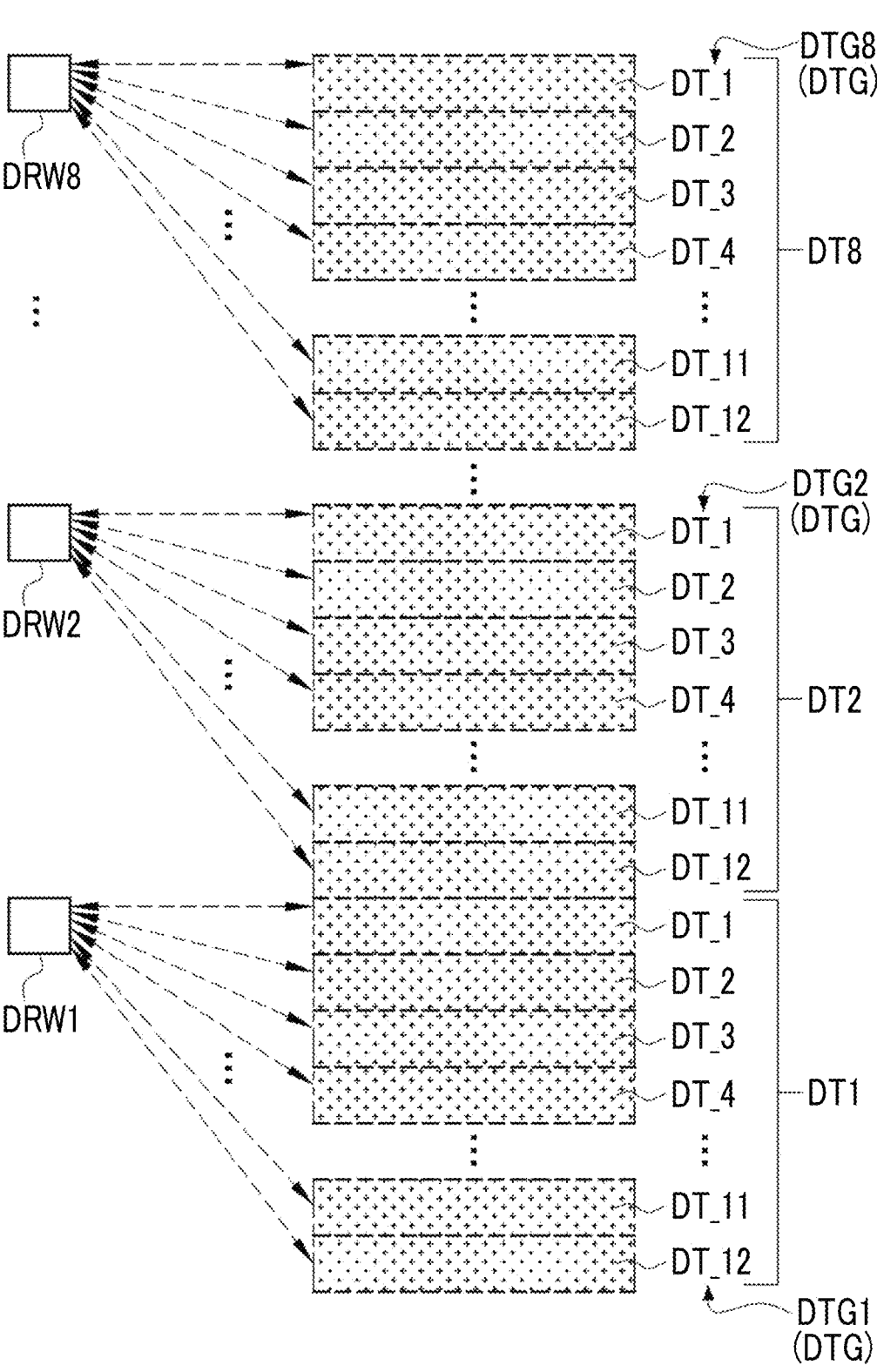
FIG. 8 is a conceptual diagram showing an example of a correspondence relationship between a data recording/reproducing element and a data track.

As shown in FIG. 8 as an example, the data track DT includes a divided data track group DTG. The data tracks DT1 to DT8 correspond to divided data track groups DTG1 to DTG8. In the following, in a case in which a particular distinction is not necessary for description, the divided data track groups DTG1 to DTG8 are referred to as a "divided data track group DTG".

The divided data track group DTG1 is a set of a plurality of divided data tracks obtained by dividing the data track DT in the width direction WD. In the example shown in FIG. 8, as an example of the divided data track group DTG1, the divided data tracks DT_1, DT_2, DT_3, DT_4, . . . , DT_11, and DT_12 obtained by dividing the data track DT into 12 equal parts in the width direction WD are shown. The data recording/reproducing element DRW1 is responsible for the magnetic processing on the divided data track group DTG1.

That is, the data recording/reproducing element DRW1 is responsible for recording data in the divided data tracks DT_1, DT_2, DT_3, DT_4, . . . , DT_11, and DT_12 and reproducing data from the divided data tracks DT_1, DT_2, DT_3, DT_4, . . . , DT_11, and DT_12. In the following, in a case in which it is not necessary to distinguish between the divided data tracks DT_1, DT_2, DT_3, DT_4, . . . , DT_11, and DT_12, the divided data tracks DT_1, DT_2, DT_3, DT_4, . . . , DT_11, and DT_12 are referred to as "divided data tracks DT_N".

Each of the data recording/reproducing elements DRW2 to DRW8 is also responsible for the magnetic processing on the divided data track group DTG of the data track DT corresponding to each data recording/reproducing element DRW, similarly to the data recording/reproducing element DRW1.

The data recording/reproducing element DRW is moved to a position corresponding to one designated data track DT among the plurality of data tracks DT with the movement of the magnetic head 28 in the width direction WD (that is, the movement along the longitudinal direction of the magnetic head 28) through the moving mechanism 48 (see FIG. 6). The data recording/reproducing element DRW is fixed at a position corresponding to one designated data track DT by a servo control using the servo pattern 52 (see FIGS. 6 and 7).

Figure 9:
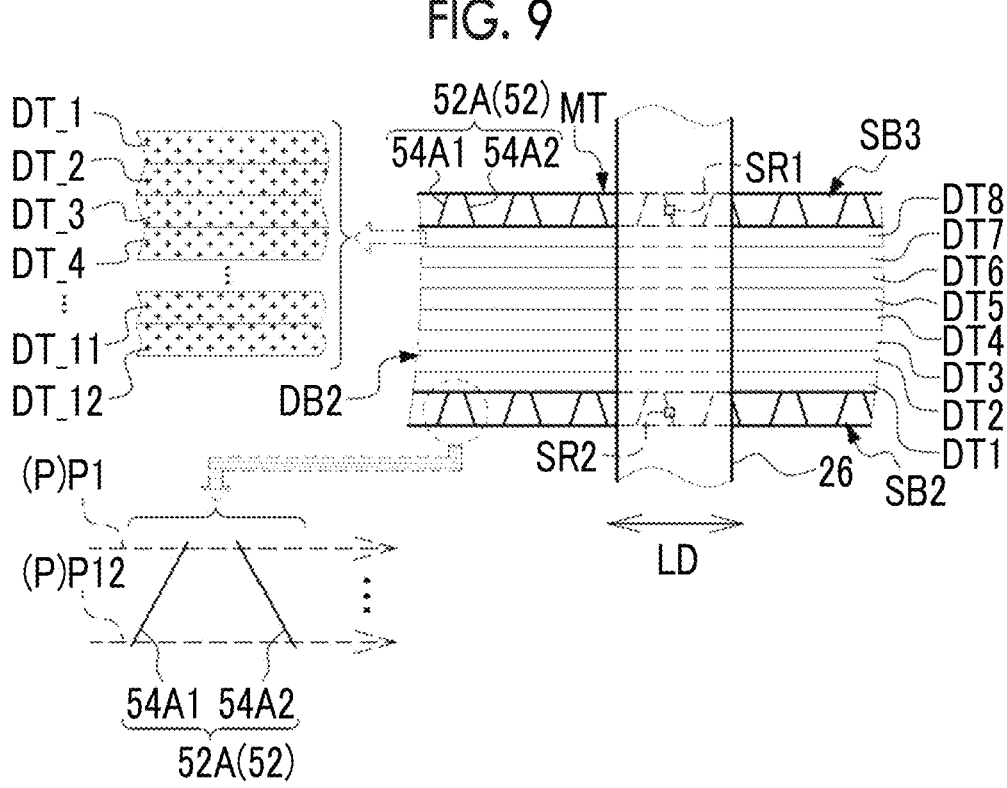
FIG. 9 is a conceptual diagram showing an example of an aspect in which a servo pattern is read by a servo reading element.

As shown in FIG. 9 as an example, in the servo pattern 52, paths P1 to P12 are assigned at equal intervals along the width direction WD. The routes P1 to P12 correspond to the plurality of divided data tracks (12 divided data tracks in the examples shown in FIGS. 8 and 9) included in the divided data track group DTG. In the following description, in a case in which it is not necessary to distinguish between the paths P1 to P12, the paths P1 to P12 are referred to as a "path P".

In a case in which the data recording/reproducing element DRW performs the magnetic processing on the processing target divided data track which is the divided data track DT_N designated as a target of the magnetic processing, the moving mechanism 48 moves the magnetic head 28 in the width direction WD such that the servo reading element SR passes on the path P corresponding to the processing target divided data track. For example, in a case in which the data recording/reproducing element DRW performs the magnetic processing on the divided data track DT_1, the moving mechanism 48 moves the magnetic head 28 in the width direction WD such that the servo reading element SR passes through the path P1. In addition, for example, in a case in which the data recording/reproducing element DRW performs the magnetic processing on the divided data track DT_12, the moving mechanism 48 moves the magnetic head 28 in the width direction WD such that the servo reading element SR passes through the path P12. As a result, the data recording/reproducing element DRW1 can face the processing target divided data track and perform the magnetic processing on the processing target divided data track.

Figure 10:
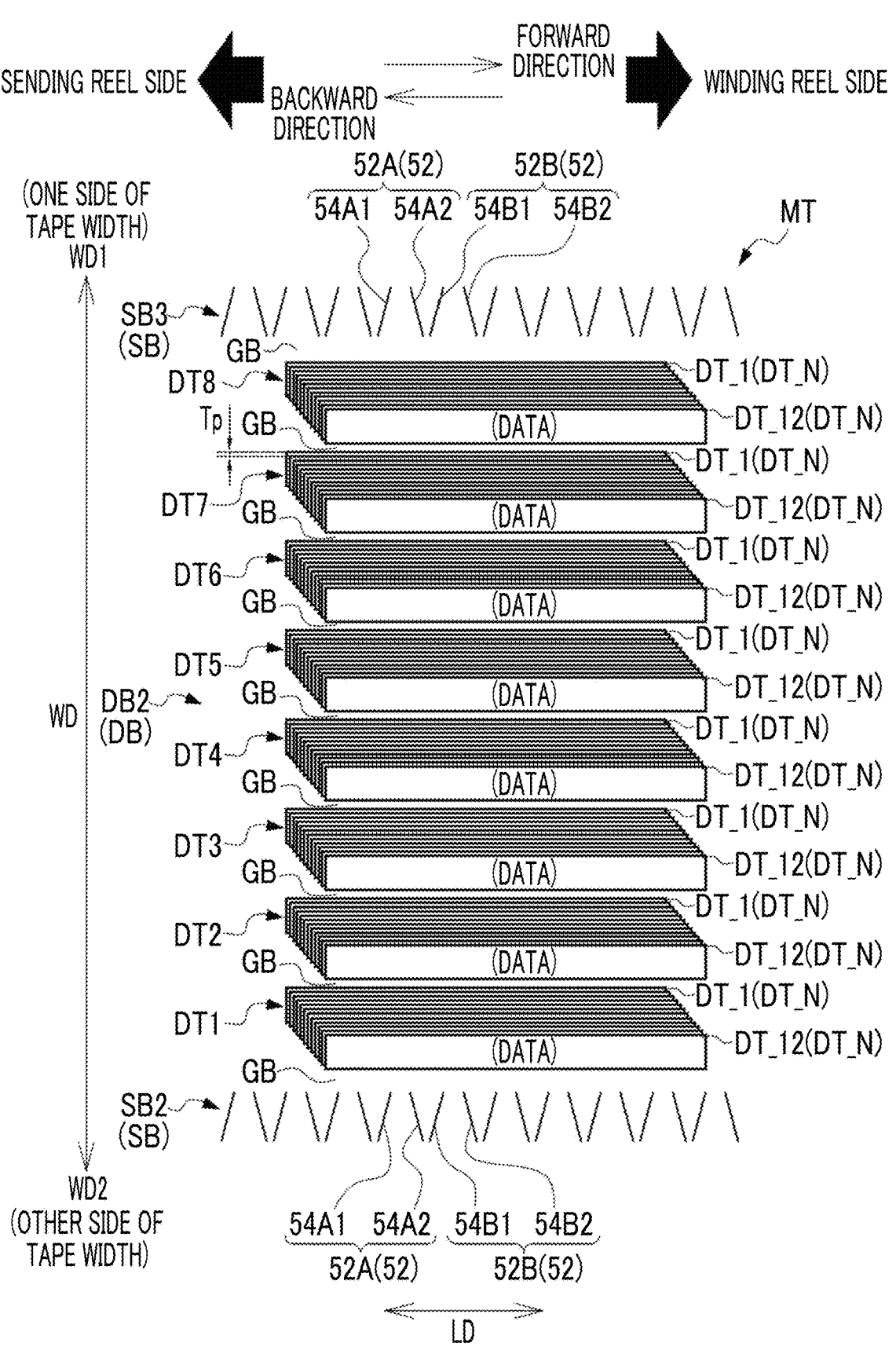
FIG. 10 is a conceptual diagram showing an example of an aspect of a data track formed by a plurality of divided data tracks being shifted and superimposed along a second direction by recording data on the front surface of the magnetic tape using an SMR method.

As shown in FIG. 10 as an example, all the divided data tracks DT_N (here, as an example, 12 divided data tracks DT_N) forming one data track DT are formed by recording data on the magnetic tape MT by the data recording/reproducing element DRW using an SMR method. The SMR method is a magnetic recording method for increasing the density of data with respect to the magnetic tape MT, and is also referred to as a shingle recording method.

In the example shown in FIG. 10, the width direction WD is defined by a first direction WD1 which is a direction of one end side of the width of the magnetic tape MT and a second direction WD2 which is a direction of the other end side of the width of the magnetic tape MT. The second direction WD2 is a direction in which data is shifted on the magnetic tape MT by recording data on the magnetic tape MT using the SMR method. The plurality of divided data tracks DT_N for each data track DT are recorded on the magnetic tape MT so as to be shifted and to overlapped with each other along the second direction WD2. For one data track DT, the divided data tracks DT_N adjacent to each other in the width direction WD are shifted from each other by a pitch Tp in the width direction WD.

In the present embodiment, the second direction WD2 is an example of a "one direction" according to the technology of the present disclosure. In addition, in the present embodiment, the plurality of divided data tracks DT_N for each data track DT are an example of a "plurality of tracks" according to the technology of the present disclosure. In addition, in the present embodiment, the pitch Tp is an example of a "pitch" according to the technology of the present disclosure. In the example shown in FIG. 10, the divided data tracks DT_1 to DT_12 are shown to be intentionally shifted in the longitudinal direction LD for easy understanding of the disposition relationship of the divided data tracks DT_1 to DT_12. However, in reality, there is no shift in the longitudinal direction LD between the divided data tracks DT_1 to DT_12, and the divided data tracks DT_1 to DT_12 extend in the longitudinal direction LD.

Guard bands GB is formed between the data tracks DT in the width direction WD. The guard band GB is a blank region that is not used for recording and reproducing data. The guard band GB formed between the data tracks DT has a role of making it difficult for the influence of the magnetic processing on one data track DT of the adjacent data tracks DT to affect the other data track DT, due to, for example, a variation in the interval between the data recording/reproducing elements DRW (for example, a variation within a manufacturing tolerances).

In addition, guard bands GB are formed between the servo band SB and the data band DB in the width direction WD. The guard band GB between the servo band SB and the data band DB has a role of making it difficult for, for example, a magnetic influence of the servo reading element SR on the servo band SB to affect the data track DT or for a magnetic influence of the data recording/reproducing element DRW to affect the servo band SB.

Figure 11:
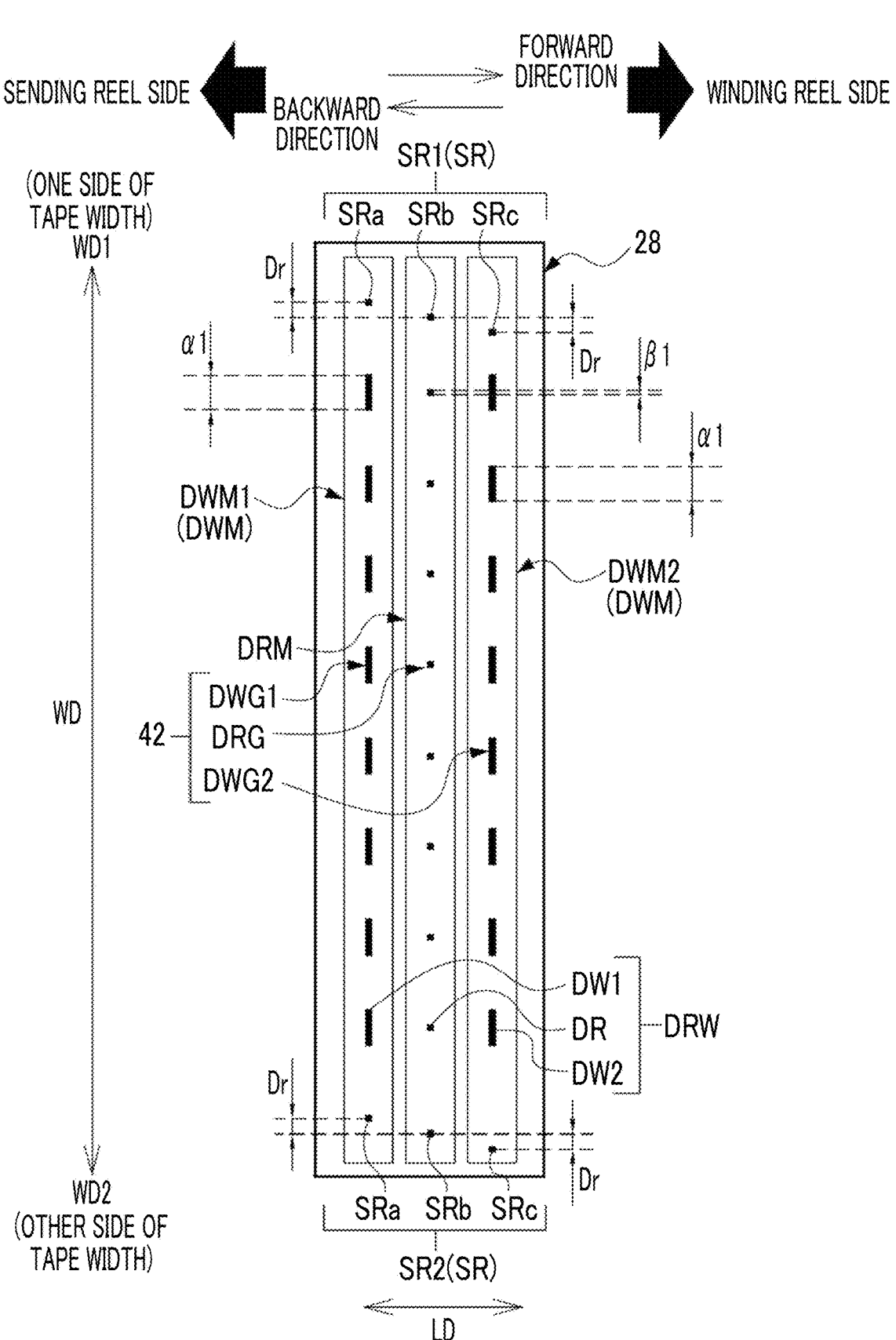
FIG. 11 is a conceptual diagram showing an example of an aspect of a first recording module, a reproducing module, and a second recording module provided in the magnetic head.

As shown in FIG. 11 as an example, the magnetic head 28 comprises a first recording module DWM1, a second recording module DWM2, and a reproducing module DRM. In the following description, for convenience of description, in a case in which it is not necessary to distinguish between the first recording module DWM1 and the second recording module DWM2, the first recording module DWM1 and the second recording module DWM2 will be referred to as a "recording module DWM". In the present embodiment, the recording module DWM is an example of a "recording module" according to the technology of the present disclosure. In addition, in the present embodiment, the reproducing module DRM is an example of a "reproducing module" according to the technology of the present disclosure.

The recording module DWM and the reproducing module DRM are disposed along the longitudinal direction LD (in other words, in the example shown in FIG. 11, the lateral direction of the magnetic head 28). For example, one recording module DWM is disposed on each of both sides of the reproducing module DRM in the longitudinal direction LD. In the example shown in FIG. 11, an aspect example of a front surface side of the magnetic head 28 in a case in which the magnetic head 28 shown in FIG. 3 is viewed from a direction opposite to the direction indicated by the arrow B shown in FIG. 3 is schematically shown, the first recording module DWM1 is disposed on the sending reel 22 (see FIG. 3) side of both sides of the reproducing module DRM in the longitudinal direction LD, and the second recording module DWM2 is disposed on the winding reel 38 (see FIG. 3) side of both sides of the reproducing module DRM in the longitudinal direction LD.

A magnetic element unit 42 is provided in the recording module DWM and the reproducing module DRM. The magnetic element unit 42 comprises a servo reading element SR1, a servo reading element SR2, a first data recording element group DWG1, a second data recording element group DWG2, and a data reproducing element group DRG. The first data recording element group DWG1 is provided in the first recording module DWM1. The second data recording element group DWG2 is provided in the second recording module DWM2. The data reproducing element group DRG is provided in the reproducing module DRM.

The servo reading element SR1 is located at one end of the magnetic element unit 42, and the servo reading element SR2 is positioned at the other end of the magnetic element unit 42.

The data recording/reproducing element DRW includes a first data recording element DW1, a second data recording element DW2, and a data reproducing element DR.

The first data recording element group DWG1 includes a plurality of first data recording elements DW1, and the plurality of first data recording elements DW1 are disposed linearly along the width direction WD (in other words, in the example shown in FIG. 11, the longitudinal direction of the magnetic head 28). The disposition direction of the plurality of first data recording elements DW1 is parallel to the front surface 31 of the magnetic tape MT and is parallel to the width direction WD (in other words, is perpendicular to the longitudinal direction LD).

The second data recording element group DWG2 includes a plurality of second data recording elements DW2, and the plurality of second data recording elements DW2 are disposed linearly along the width direction WD. The disposition direction of the plurality of second data recording elements DW2 is parallel to the front surface 31 of the magnetic tape MT and is parallel to the width direction WD (in other words, is perpendicular to the longitudinal direction LD).

The data reproducing element group DRG includes a plurality of data reproducing elements DR, and the plurality of data reproducing elements DR are disposed linearly along the width direction WD. The disposition direction of the plurality of data reproducing elements DR is parallel to the front surface 31 of the magnetic tape MT and is parallel to the width direction WD (in other words, is perpendicular to the longitudinal direction LD).

In the following description, for convenience of description, in a case in which it is not necessary to distinguish between the first data recording element DW1 and the second data recording element DW2, the first data recording element DW1 and the second data recording element DW2 will be referred to as a "data recording element DW".

The data recording element DW records data onto the data track DT. The data reproducing element DR reproduces data from the data track DT.

The first data recording element group DWG1, the second data recording element group DWG2, and the data reproducing element group DRG are arranged at constant intervals in the order of the first data recording element group DWG1, the data reproducing element group DRG, and the second data recording element group DWG2, from the winding reel 38 side to the sending reel 22 side along the longitudinal direction LD. Here, the constant interval refers to, for example, an interval predetermined by a test with a real machine and/or a computer simulation as an interval at which crosstalk does not occur between the data recording element DW and the data reproducing element DR.

The servo reading element SR has a first servo reading element SRa, a second servo reading element SRb, and a third servo reading element SRc. That is, each of the servo reading elements SR1 and SR2 includes a first servo reading element SRa, a second servo reading element SRb, and a third servo reading element SRc.

The first servo reading element SRa, the second servo reading element SRb, and the third servo reading element SRc are provided in the order of the first servo reading element SRa, the second servo reading element SRb, and the third servo reading element SRc from the sending reel 22 (see FIG. 3) side to the winding reel 38 (see FIG. 3) side in the longitudinal direction LD.

The first data recording element group DWG1 has a plurality of first data recording elements DW1. The first data recording element DW1 records data onto the corresponding data track DT among all the data tracks DT included in the data band DB.

The first recording module DWM1 is provided with a pair of first servo reading elements SRa, and the pair of first servo reading elements SRa are adjacent to each other in the width direction WD with a plurality of first data recording elements DW1 interposed therebetween. In the first recording module DWM1, a plurality of first data recording elements DW1 are disposed linearly and at equal intervals between one and the other of the pair of first servo reading elements SRa.

The number of the plurality of first data recording elements DW1 included in the first data recording element group DWG1 is the same as the number of the data tracks DT included in the data band DB. In the example shown in FIG. 11, eight first data recording elements DW1 are exemplified as the plurality of first data recording elements DW1, and the positions of the first data recording elements DW1 correspond to the positions of the data recording/reproducing elements DRW1, DRW2, DRW3, DRW4, DRW5, DRW6, DRW7, and DRW8 (see FIGS. 7 and 8).

In the present embodiment, the pair of first servo reading elements SRa is an example of a "pair of first servo reading elements adjacent to each other in the width direction of the magnetic tape among the plurality of servo reading elements" according to the technology of the present disclosure. In addition, in the present embodiment, the plurality of first data recording elements DW1 are an example of a "plurality of recording elements" according to the technology of the present disclosure.

The data reproducing element group DRG has a plurality of data reproducing elements DR. The data reproducing element DR reproduces data from the corresponding data track DT among all the data tracks DT included in the data band DB.

The reproducing module DRM is provided with a pair of second servo reading elements SRb, and the pair of second servo reading elements SRb are adjacent to each other in the width direction WD with a plurality of data reproducing elements DR interposed therebetween. In the reproducing module DRM, the plurality of data reproducing elements DR are disposed linearly and at equal intervals between one and the other of the pair of second servo reading elements SRb.

The number of the plurality of data reproducing elements DR included in the data reproducing element group DRG is the same as the number of the data tracks DT included in the data band DB. In the example shown in FIG. 11, eight data reproducing elements DR are exemplified as the plurality of data reproducing elements DR, and the positions of these data reproducing elements DR correspond to the positions of the data recording/reproducing elements DRW1, DRW2, DRW3, DRW4, DRW5, DRW6, DRW7, and DRW8 (see FIGS. 7 and 8).

In the present embodiment, the pair of second servo reading elements SRb is an example of a "pair of second servo reading elements adjacent to each other in the width direction among the plurality of servo reading elements" according to the technology of the present disclosure. In addition, in the present embodiment, the plurality of data reproducing elements DR are an example of a "plurality of reproducing elements" according to the technology of the present disclosure.

The second data recording element group DWG2 includes a plurality of second data recording elements DW2. The second data recording element DW2 records data onto the corresponding data track DT among all the data tracks DT included in the data band DB.

The second recording module DWM2 is provided with a pair of third servo reading elements SRc, and the pair of third servo reading elements SRc are adjacent to each other in the width direction WD with a plurality of second data recording elements DW2 interposed therebetween. In the second recording module DWM2, a plurality of second data recording elements DW2 are disposed linearly and at equal intervals between one and the other of the pair of third servo reading elements SRc.

The number of the plurality of second data recording elements DW2 included in the second data recording element group DWG2 is the same as the number of the data tracks DT included in the data band DB. In the example shown in FIG. 11, eight second data recording elements DW2 are exemplified as the plurality of second data recording elements DW2, and the positions of the second data recording elements DW2 correspond to the positions of the data recording/reproducing elements DRW1, DRW2, DRW3, DRW4, DRW5, DRW6, DRW7, and DRW8 (see FIGS. 7 and 8).

In the present embodiment, the pair of third servo reading elements SRc is an example of a "pair of first servo reading elements adjacent to each other in the width direction of the magnetic tape among the plurality of servo reading elements" according to the technology of the present disclosure. In addition, in the present embodiment, the plurality of second data recording elements DW2 are an example of a "plurality of recording elements" according to the technology of the present disclosure.

Here, an example of a geometric relationship between the data recording element DW and the data reproducing element DR included in the data recording/reproducing element DRW corresponding to one data track DT will be described.

In the magnetic head 28 on the magnetic tape MT, the center position of the data recording element DW and the center position of the data reproducing element DR, which are included in the data recording/reproducing element DRW corresponding to one data track DT, aligns with each other in the width direction WD. Here, the center position of the data recording element DW refers to, for example, a center position of the data recording element DW in the width direction WD. In addition, the center position of the data reproducing element DR refers to, for example, a center position of the data reproducing element DR in the width direction WD. Here, the term "align" refers to, in addition to complete alignment, alignment in the sense of including error that is error generally allowed in the technical field to which the disclosed technology belongs and that is of a degree not contradicting the gist of the disclosed technology.

In the present embodiment, the center position of the data recording element DW aligns with the center position of the data reproducing element DR in the width direction WD, and this is also for realizing so-called "read while write". In the "read while write", in order to verify whether or not the data recorded during the recording operation on the magnetic tape MT is correctly recorded, in a case in which the magnetic tape MT is transported in the forward direction while the first recording module DWM1 records the data onto the magnetic tape MT in accordance with the servo signal obtained by the first servo reading element SRa, the data is reproduced by the reproducing module DRM immediately after the transporting. Even in a case in which the magnetic tape MT is transported in the reverse direction and the data is recorded on the magnetic tape MT by the second recording module DWM2, "read while write" is performed between the second recording module DWM2 and the reproducing module DRM in the same manner.

In addition, in the data recording/reproducing element DRW corresponding to one data track DT, a length $\alpha 1$, which is a length of the data recording element DW in the width direction WD, is longer than a length $\beta 1$, which is a length of the data reproducing element DR in the width direction WD, and is equal to or longer than twice the pitch Tp. In addition, the length $\beta 1$ is equal to or shorter than the pitch Tp (see FIG. 10). Here, the pitch Tp or less refers to, for example, half or less of the pitch Tp.

Here, an example of the length $\alpha 1$ is 2.5 μm, and an example of the length $\beta 1$ is 1.0 um. Examples of the ratio of the length $\alpha 1$ to the length $\beta 1$ include "length $\alpha 1$:length $\beta 1$=5:2". However, this is merely an example, and the length $\alpha 1$ may be 10 um and the length $\beta 1$ may be 0.5 um, and the lengths are determined according to specifications of the magnetic tape MT, the magnetic head 28, and/or the magnetic tape drive 14. In the present embodiment, the length $\alpha 1$ is an example of a "first length" according to the technology of the present disclosure. In addition, in the present embodiment, the length $\beta 1$ is an example of a "second length" according to the technology of the present disclosure.

After the data track DT (see FIG. 10) is formed by the first data recording element DW1 using the SMR method in accordance with the servo pattern signal obtained when the first servo reading element SRa reads the servo pattern 52, the data is reproduced from the divided data track DT_N (see FIG. 10) included in the data track DT by the data reproducing element DR. In this case, the data reproducing element DR reproduces the data from the divided data track DT_N in accordance with the servo pattern signal obtained when the second servo reading element SRb reads the servo pattern 52.

In a case in which the data track DT is formed using the SMR method, the adjacent divided data tracks DT_N overlap each other. Therefore, a region in which the data is reproduced by the data reproducing element DR is narrower in a case in which the data is reproduced by the data reproducing element DR than in a case in which the data is recorded by the first data recording element DW1. For example, in the example shown in FIG. 10, only a region of the pitch Tp in the divided data track DT_N is the data reproducing target region by the data reproducing element DR.

In the known technology of the related art, since the first servo reading element SRa and the second servo reading element SRb are aligned in the width direction WD, in a case of reproducing data with respect to the data track DT formed using the SMR method (that is, in a case in which the data reproducing element DR reproduces data from the divided data track DT_N), it is necessary to shift the position of the magnetic head 28 in the width direction WD by $\Delta x$ ($=(\alpha 1-Tp)/2$) as compared with a case in which the data is recorded by the first data recording element DW1. That is, it is required to cause the second servo reading element SRb to read the servo pattern 52 on the path P shifted by $\Delta x$ in the width direction WD from the path P through which the first servo reading element SRa passes.

Here, in a case in which the servo pattern 52 has an ideal geometrical shape (for example, ideal linearity), the data reproducing element DR can reproduce the data from the divided data track DT_N by moving the magnetic head 28 in the width direction WD in accordance with design values (for example, $\Delta x$) such as the pitch Tp and the length $\alpha 1$.

However, the actual servo pattern 52 has non-linearity and has an error from an ideal geometrical shape. Therefore, in a case in which the pitch Tp is narrowed by increasing a density of the data recorded on the magnetic tape MT (that is, increasing a density of the plurality of divided data tracks DT_N), it is considered that the geometrical shape (for example, linearity) of the servo pattern 52 read by the second servo reading element SRb greatly affects the reproduction of the data by the data reproducing element DR. For example, it is considered that the reproduction of the data on the divided data track DT_N occurs without the intention of the user or the like. It is expected that this phenomenon will be more remarkable as the density of the data recorded on the magnetic tape MT increases.

In order to reduce the influence of the geometry of the servo pattern 52 on the reproduction of data by the data reproducing element DR, it is desirable to align a position at which the servo pattern 52 is read by the first servo reading element SRa in a case in which the data is recorded using the SMR method, with a position at which the servo pattern 52 is read by the second servo reading element SRb in a case in which the data is reproduced from the data track DT formed using the SMR method.

In the present embodiment, the pair of first servo reading elements SRa and the pair of second servo reading elements SRb are disposed in a state of being shifted from each other by a predetermined difference Dr along the second direction WD2. In the example shown in FIG. 11, the pair of second servo reading elements SRb is shifted from the pair of first servo reading elements SRa by a predetermined difference Dr along the second direction WD2. In other words, a value obtained by subtracting a distance in the width direction WD between the first data recording element DW1 closest to the second servo reading element SRb in the first data recording element group DWG1 and the second servo reading element SRb from a distance in the width direction WD between the first data recording element DW1 closest to the first servo reading element SRa in the first data recording element group DWG1 and the first servo reading element SRa is set as the predetermined difference Dr.

In addition, the pair of second servo reading elements SRb and the pair of third servo reading elements SRc are disposed in a state of being shifted from each other by the predetermined difference Dr along the second direction WD2. In the example shown in FIG. 11, the pair of third servo reading elements SRc is shifted from the pair of second servo reading elements SRb by the predetermined difference Dr along the second direction WD2. In other words, a value obtained by subtracting a distance in the width direction WD between the second data recording element DW2 closest to the third servo reading element SRc in the second data recording element group DWG2 and the third servo reading element SRc from a distance in the width direction WD between the second data recording element DW2 closest to the second servo reading element SRb in the second data recording element group DWG2 and the second servo reading element SRb is set as the predetermined difference Dr.

The predetermined difference Dr is defined based on the pitch Tp (see FIG. 10) and the length $\alpha 1$. The predetermined difference Dr is longer than the pitch Tp. In the present embodiment, the predetermined difference Dr is defined by the following Expression (1). In the present embodiment, the predetermined difference Dr is an example of a "predetermined difference" according to the technology of the present disclosure.

$$DR = (\alpha 1 - Tp)/2 \tag{1}$$

Next, an action of the magnetic tape system 10 according to the present embodiment will be described with reference to FIGS. 12 to 16.

First, a case in which the first recording module DWM1 forms the data track DT on the magnetic tape MT will be described.

Figure 12:
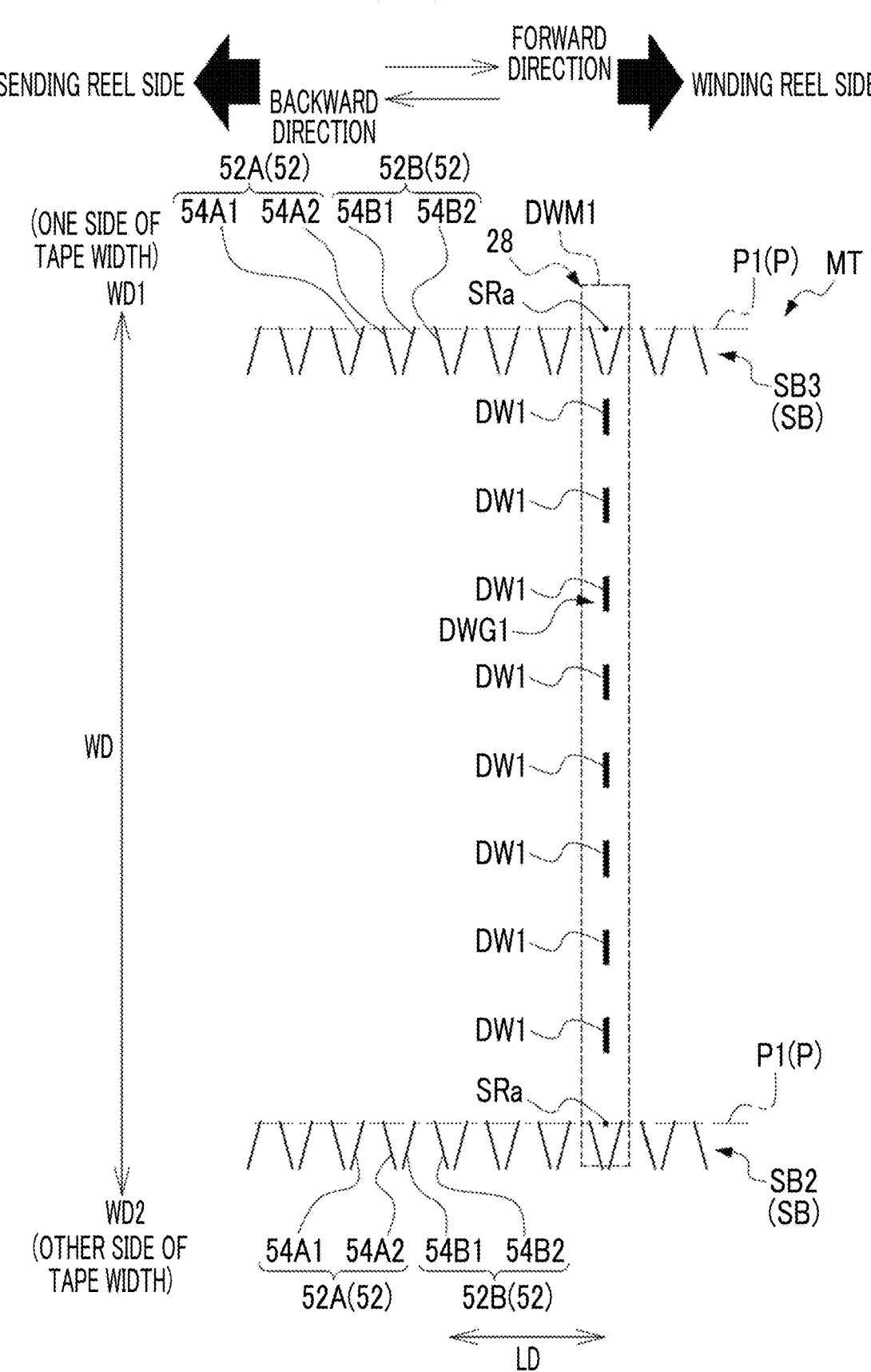
FIG. 12 is a conceptual diagram showing an example of an aspect of the first recording module in a case in which the servo pattern is read by a pair of servo reading elements through a path closest to one end side of the magnetic tape width among a plurality of paths.

As shown in FIG. 12 as an example, first, the pair of first servo reading elements SRa are positioned in the servo bands SB adjacent to each other in the width direction WD. Specifically, one first servo reading element SRa of the pair of first servo reading elements SRa (hereinafter, also referred to as "one first servo reading element SRa") is positioned in the servo band SB3, and the other first servo reading element SRa of the pair of first servo reading elements SRa (hereinafter, also referred to as "the other first servo reading element SRa") is positioned in the servo band SB2. More specifically, the first recording module DWM1 is positioned on the magnetic tape MT by moving the magnetic head 28 in the width direction WD such that one first servo reading element SRa is positioned on the path P1 of the servo band SB3 and the other first servo reading element SRa is positioned on the path P1 of the servo band SB2.

Figure 13:
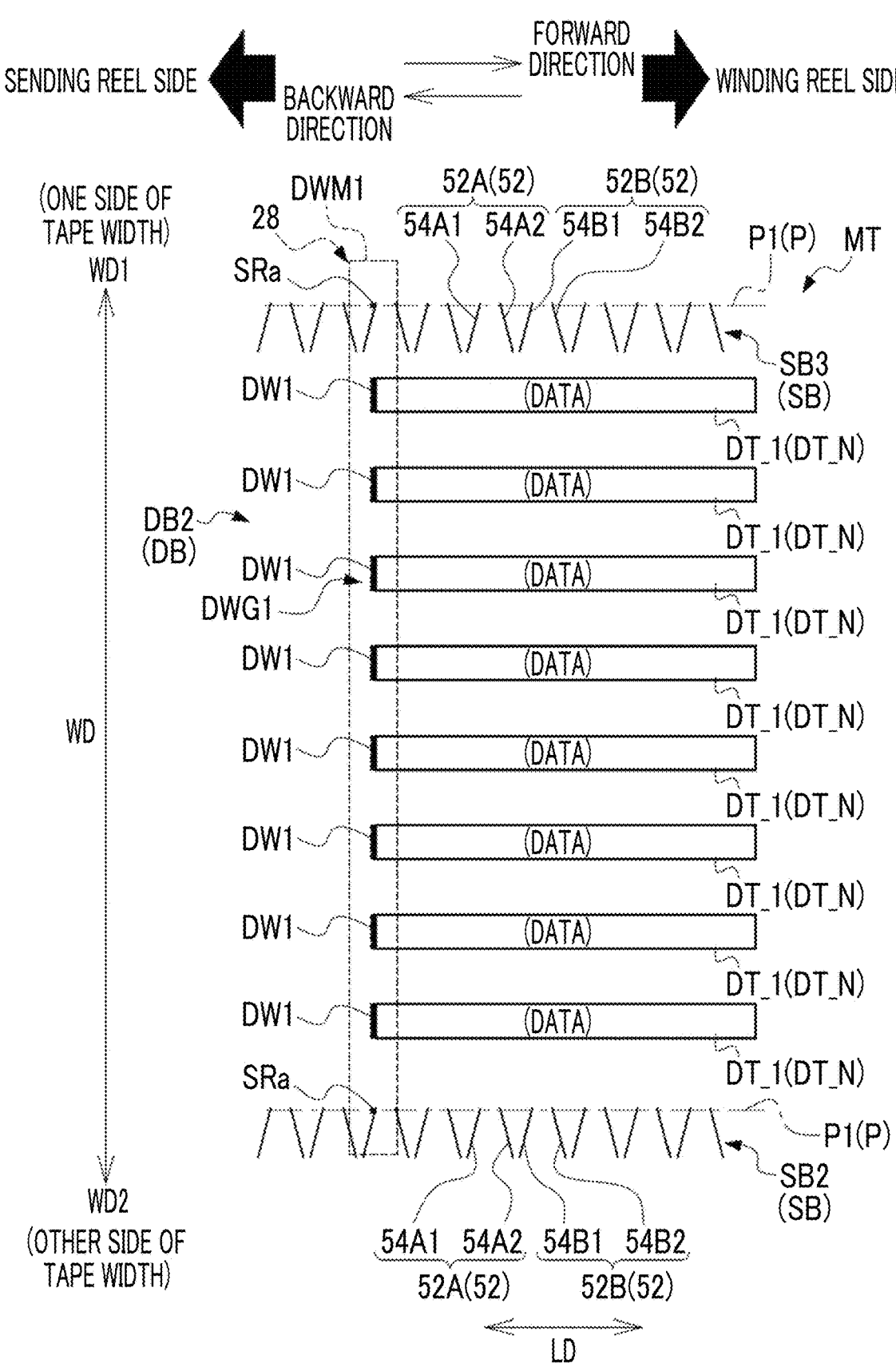
FIG. 13 is a conceptual diagram showing an example of an aspect in a case in which one divided data track is formed by each of a plurality of first data recording elements of a first recording module.

In this state, the magnetic tape MT is caused to travel in the forward direction, and the recording processing is performed on each data recording element DW1 of the first recording module DWM1. As a result, as shown in FIG. 13 as an example, the divided data track DT_1 is formed by each data recording element DW1 of the first recording module DW1 with respect to the magnetic tape MT.

After the divided data track DT_1 is formed, the magnetic tape MT is caused to travel in the reverse direction to return the first recording module DWM1 to the position where the formation of the divided data track DT_1 is started. Then, in a state in which the magnetic head 28 is shifted by the pitch Tp along the second direction WD2, the magnetic tape MT is caused to travel in the forward direction and the recording processing is performed on each data recording element DW1 of the first recording module DWM1. As a result, the divided data track DT_2 is formed by each data recording element DW1 of the first recording module DWM1 on the magnetic tape MT.

Figure 14:
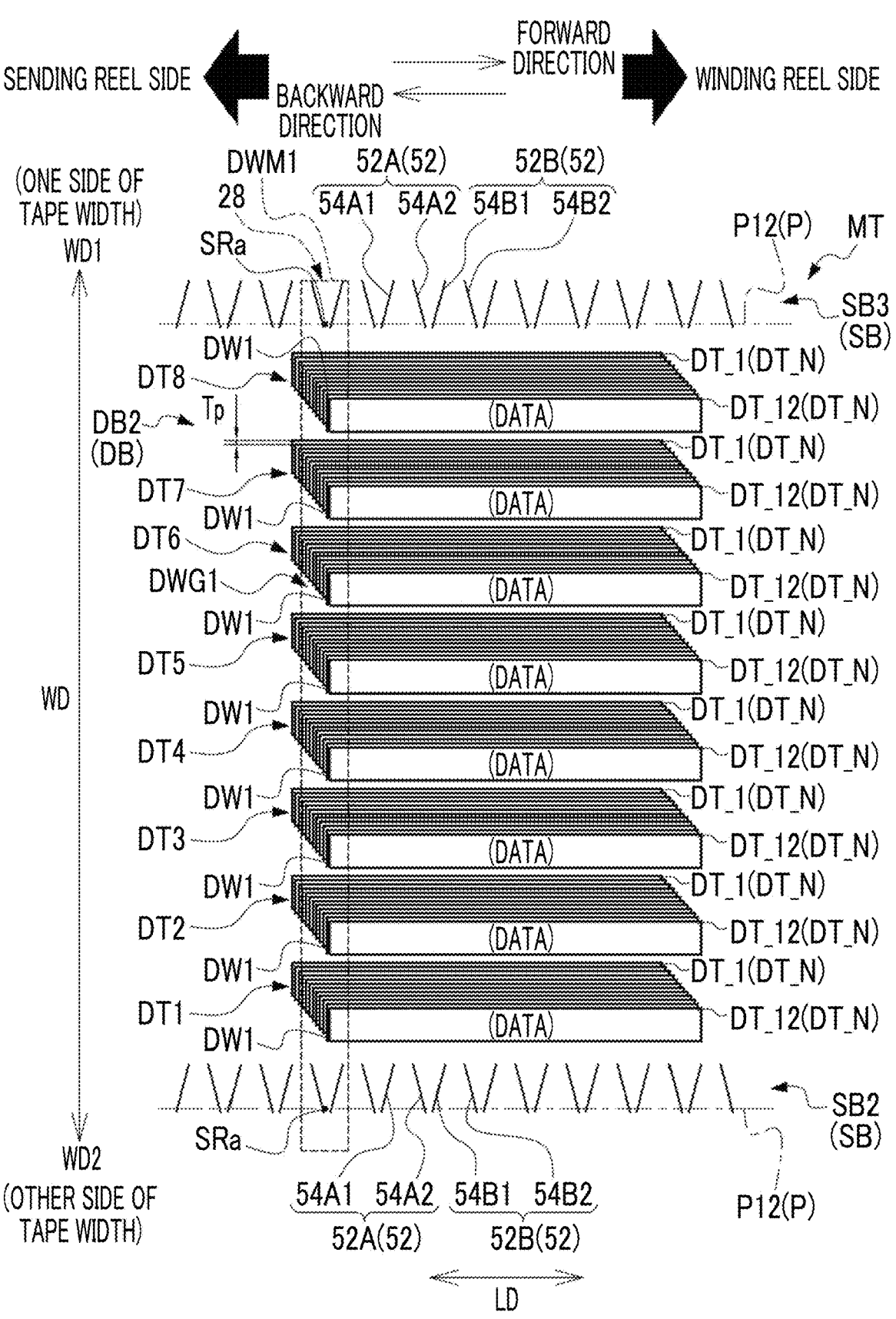
FIG. 14 is a conceptual diagram showing an example of an aspect of a data track formed by a plurality of divided data tracks being shifted and superimposed along a second direction by each of the plurality of first data recording elements of a first recording module.

In the same manner as in a case in which the divided data tracks DT_1 and DT_2 are sequentially formed, the divided data tracks DT_3 to DT_12 are sequentially formed by each data recording element DW1 of the first recording module DWM1. As a result, as shown in FIG. 14 as an example, in the width direction WD, a data band DB2 including the data tracks DT1 to DT8 is formed between the servo band SB2 and the servo band SB3.

Next, a case in which the reproducing module DRM sequentially reproduces the data from the divided data track DT_1 to the divided data track DT_12 included in each data track DT will be described.

Figure 15:
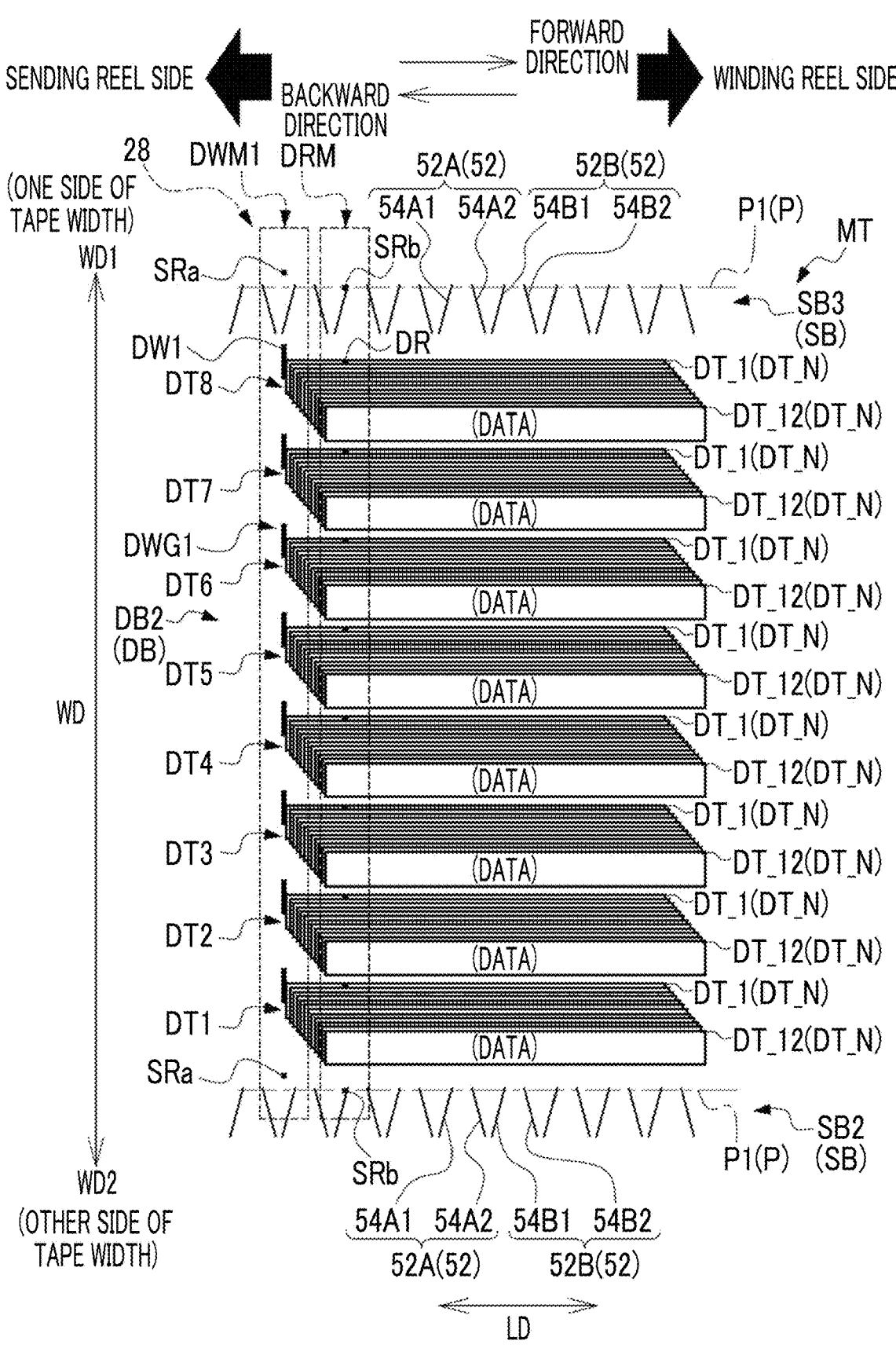
FIG. 15 is a conceptual diagram showing an example of an aspect of the first recording module and the reproducing module in a case in which the data reproducing element reproduces data from a divided data track closest to one end side of a magnetic tape width among the plurality of divided data tracks forming one data track.

As shown in FIG. 15 as an example, first, the pair of second servo reading elements SRb are positioned in the servo bands SB adjacent to each other in the width direction WD. Specifically, one second servo reading element SRb of the pair of second servo reading elements SRb (hereinafter, also referred to as "one second servo reading element SRb") is positioned in the servo band SB3, and the other second servo reading element SRb of the pair of second servo reading elements SRb (hereinafter, also referred to as "the other second servo reading element SRb") is positioned in the servo band SB2. More specifically, the reproducing module DRM is positioned on the magnetic tape MT by moving the magnetic head 28 in the width direction WD such that one second servo reading element SRb is positioned on the path P1 of the servo band SB3 and the other second servo reading element SRb is positioned on the path P1 of the servo band SB2.

In this state, the magnetic tape MT is caused to travel in the forward direction, and the reproducing processing is performed on each data reproducing element DR of the reproducing module DRM. As a result, the data is reproduced from the divided data track DT_1 by each data reproducing element DR of the reproducing module DRM on the magnetic tape MT.

After the data is reproduced from divided data track DT_1, the magnetic tape MT is caused to travel in the reverse direction to return the reproducing module DRM to the position where the reproduction of data from the divided data track DT_1 is started. Then, in a state in which the magnetic head 28 is shifted by the pitch Tp along the second direction WD2, the magnetic tape MT is caused to travel in the forward direction and the reproducing processing is performed on each data reproducing element DR of the reproducing module DRM. As a result, the data is reproduced from the divided data track DT_2 by each data reproducing element DR of the reproducing module DRM on the magnetic tape MT.

In the same manner as in a case in which the data is sequentially reproduced from the divided data track DT_1 and divided data track DT_2, the reproduction of data is sequentially performed from the divided data tracks DT_3 to DT_12 by each data reproducing element DR of the reproducing module DRM.

Figure 16:
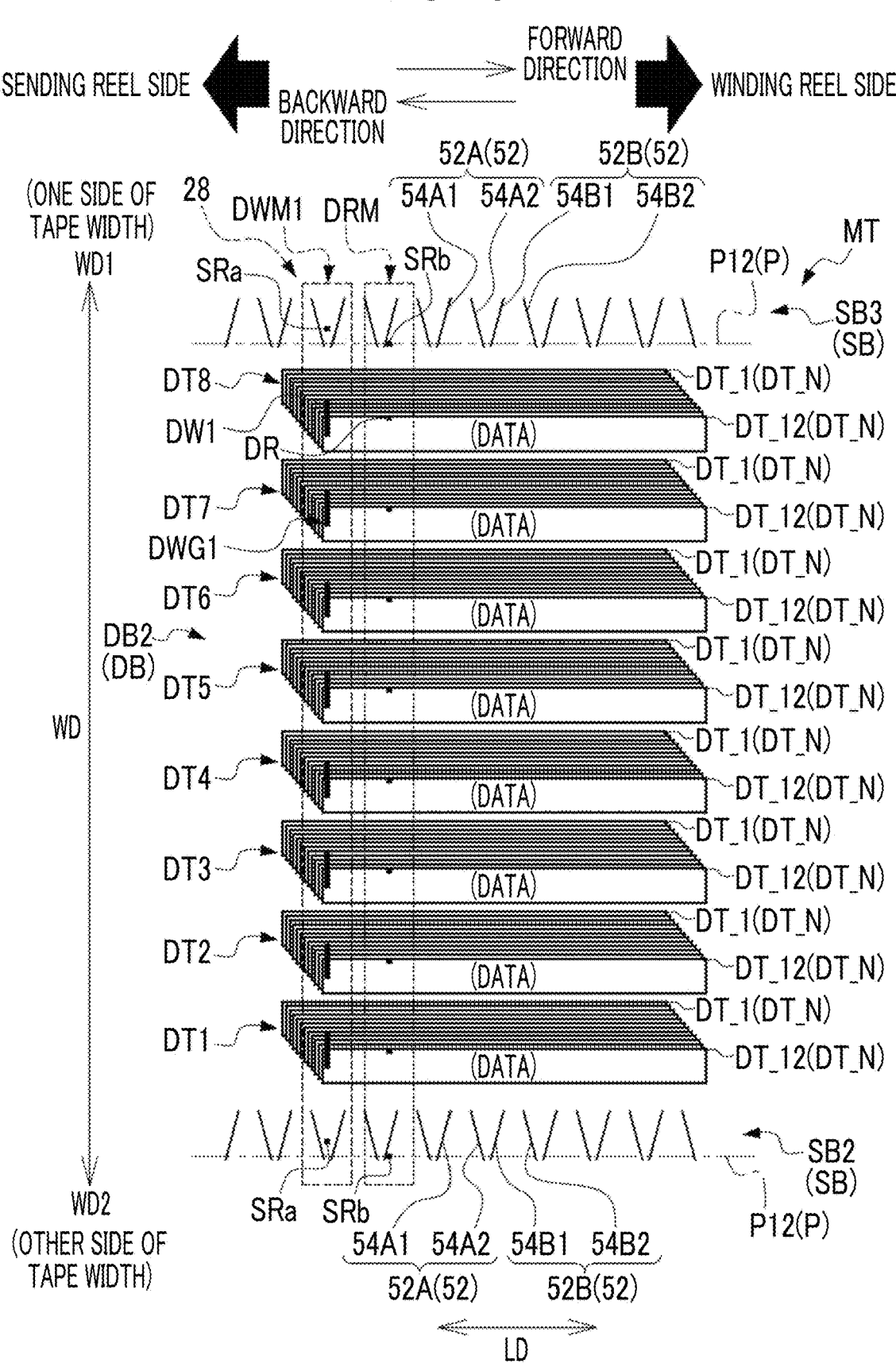
FIG. 16 is a conceptual diagram showing an example of an aspect of the first recording module and the reproducing module in a case in which the data reproducing element reproduces data from a divided data track closest to the other end side of the magnetic tape width among the plurality of divided data tracks forming one data track.

In the example shown in FIG. 16, one second servo reading element SRb is positioned on the path P12 of the servo band SB3, and the other second servo reading element SRb is positioned on the path P12 of the servo band SB2. In this state, the magnetic tape MT is caused to travel in the forward direction, and the reproducing processing is performed on each data reproducing element DR of the reproducing module DRM. As a result, the data is reproduced from the divided data track DT_12 by each data reproducing element DR of the reproducing module DRM on the magnetic tape MT.

Here, although an example of a form in which the data from the divided data tracks DT_1 to DT_12 is sequentially reproduced from the divided data track DT_1 to the divided data track DT_12 is described, this is merely an example, and the data may be sequentially reproduced from the divided data track DT_12 to the divided data track DT_1, or the data may be reproduced from the divided data track DT_N designated by the user or the like.

Figure 17:
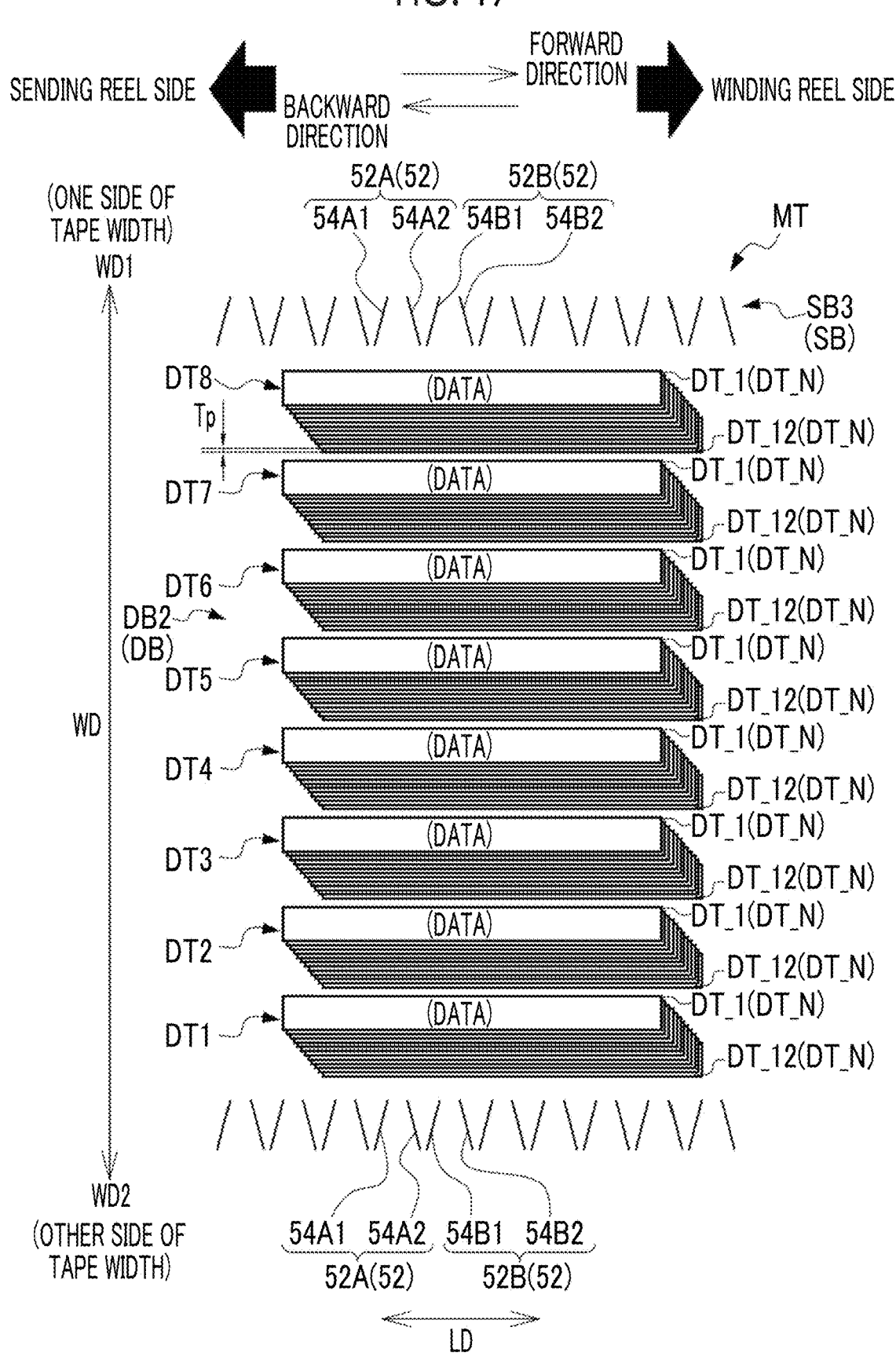
FIG. 17 is a conceptual diagram showing an example of an aspect of a data track formed by a plurality of pieces of the divided data tracks being shifted and superimposed along a first direction by each of a plurality of data recording elements of a recording module.

In the examples shown in FIGS. 12 to 16, a case in which the divided data tracks DT_1 to DT_12 are overlapped while being shifted sequentially by the pitch Tp along the second direction WD2 is described, but the technology of the present disclosure is not limited thereto. For example, as shown in FIG. 17, the plurality of divided data tracks DT_N may be formed by being superimposed along the first direction WD1 using the SMR method. In this case, the second recording module DWM2 is used. Specifically, the servo pattern 52 is read by the pair of third servo reading elements SRc while the pair of third servo reading elements SRc is moved along the path P by moving the pair of third servo reading elements SRc sequentially from the path P12 to the path P1 and causing the magnetic tape MT to travel in the backward direction. The magnetic head 28 is moved along the first direction WD1 in accordance with the servo signal obtained in this manner, and the divided data tracks DT_12 to DT_1 are sequentially superimposed along the first direction WD1. The data is reproduced from the divided data tracks DT_1 to DT_12 by each data reproducing element DR of the reproducing module DRM in the above-described manner.

Figure 18:
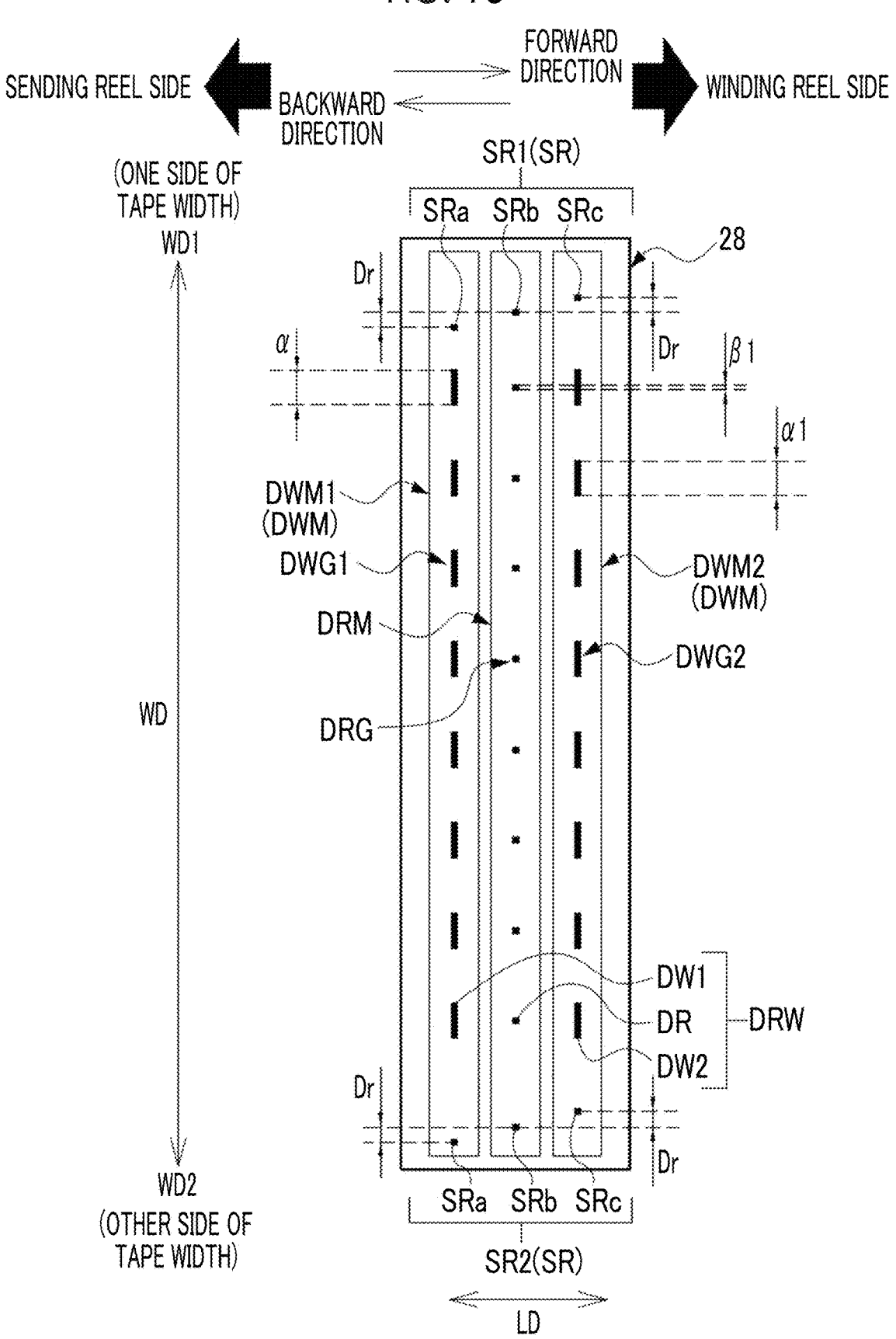
FIG. 18 is a conceptual diagram showing a first modification example of the configuration of the magnetic head.

As an example, as shown in FIG. 18, the position of the servo reading element SRa in the first recording module DWM1 with respect to the servo reading element SRb in the width direction WD may be the same as the position of the servo reading element SRc in the second recording module DWM2 with respect to the servo reading element SRb in the width direction WD shown in FIG. 11. In addition, as an example, as shown in FIG. 18, the position of the servo reading element SRc in the second recording module DWM2 with respect to the servo reading element SRb in the width direction WD may be the same as the position of the servo reading element SRa in the first recording module DWM1 with respect to the servo reading element SRb in the width direction WD shown in FIG. 11. In the example shown in FIG. 18, the plurality of divided data tracks DT_N are formed by overlapping the plurality of divided data tracks DT_N in the first direction WD1 by the first recording module DWM1 using the SMR method, and the plurality of divided data tracks DT_N are formed by overlapping the plurality of divided data tracks DT_N in the second direction WD2 by the second recording module DWM2 using the SMR method.

As described above, in the magnetic tape system 10 according to the present embodiment, the recording module DWM and the reproducing module DRM are provided in the magnetic head 28, and the recording module DWM and the reproducing module DRM are disposed along the longitudinal direction LD. The pair of first servo reading elements SRa and the pair of second servo reading elements SRb are shifted from each other by the predetermined difference Dr along the second direction WD2. The predetermined difference Dr is defined based on the pitch Tp between the plurality of divided data tracks DT_N formed by recording the data on the magnetic tape MT by the first data recording element DW1 using the SMR method and the length $\alpha 1$ which is the length of the first data recording element DW1 in the width direction WD.

Therefore, in a case where the data is recorded on the magnetic tape MT using the SMR method, the reading position of the servo pattern 52 read by the servo reading element SR can be aligned with the reading position of the servo pattern 52 during the reproduction of the data.

As a result, for example, the same position as the position read by the first servo reading element SRa in the servo band SB in a case where the divided data track DT_1 is formed by the first data recording element DW1 is also read by the second servo reading element SRb in a case where the data is reproduced from the divided data track DT_1. In addition, for example, the same position as the position read by the third servo reading element SRc in the servo band SB in a case where the divided data track DT_1 is formed by the second data recording element DW2 is also read by the second servo reading element SRb in a case where the data is reproduced from the divided data track DT_1.

In addition, even in a case in which a geometrical characteristic of the servo pattern 52 is not an ideal geometrical characteristic and the pitch Tp is narrowed for increasing the density of the data recorded on the magnetic tape MT, in a case in which the data is recorded on the magnetic tape MT using the SMR method, the reading position of the servo pattern 52 read by the servo reading element SR can be aligned with the reading position of the servo pattern 52 during the reproduction of the data. Therefore, the data can be reproduced with high accuracy from the divided data track DT_N designated by the user or the like.

In addition, in the magnetic tape system 10 according to the present embodiment, in the magnetic head 28 on the magnetic tape MT, the center position of the data recording element DW aligns with the center position of the data reproducing element DR in the width direction WD. Therefore, in a case in which the data is recorded on the magnetic tape MT using the SMR method, the reading position of the servo pattern 52 read by the servo reading element SR and the reading position of the servo pattern 52 during the reproduction of the data can be easily aligned with each other, as compared with a case in which the center position of the data recording element DW and the center position of the data reproducing element DR do not align with each other in the width direction WD in the magnetic head 28 on the magnetic tape MT. In addition, since the center position of the data recording element DW aligns with the center position of the data reproducing element DR in the width direction WD, it is possible to realize the verification of the data recorded on the magnetic tape MT by "Read while write".

In addition, in the magnetic tape system 10 according to the present embodiment, in the magnetic head 28 on the magnetic tape MT, the center position of the data recording element DW and the center position of the data reproducing element DR, which are included in the data recording/reproducing element DRW corresponding to one data track DT, align with each other in the width direction WD. In addition, in the data recording/reproducing element DRW corresponding to one data track DT, a length $\alpha 1$, which is a length of the data recording element DW in the width direction WD, is longer than a length $\beta 1$, which is a length of the data reproducing element DR in the width direction WD, and is equal to or longer than twice the pitch Tp. In addition, the length $\beta 1$ is equal to or shorter than the pitch Tp. Here, the pitch Tp or less refers to, for example, half or less of the pitch Tp. Therefore, in a case in which the data is recorded on the magnetic tape MT using the SMR method, the reading position of the servo pattern 52 read by the servo reading element SR and the reading position of the servo pattern 52 during the reproduction of the data can be accurately aligned with each other, as compared with a case in which such a geometric relationship is not established between the data recording element DW and the data reproducing element DR.

In addition, in the magnetic tape system 10 according to the present embodiment, the pair of first servo reading elements SRa and the pair of second servo reading elements SRb are shifted from each other by the predetermined difference Dr along the second direction WD2. The second direction WD2 is a direction in which data is shifted on the magnetic tape MT by recording data on the magnetic tape MT using the SMR method. That is, the plurality of divided data tracks DT_N are shifted and superimposed along the second direction WD2. As described above, in a case in which the data is recorded on the magnetic tape MT using the SMR method, the reading position of the servo pattern 52 read by the servo reading element SR can be aligned with the reading position of the servo pattern 52 during the reproduction of the data. Therefore, the data can be reproduced by the data reproducing element DR from the plurality of divided data tracks DT_N formed by the data being shifted along the second direction WD2 on the magnetic tape MT by recording the data using the SMR method with respect to the magnetic tape MT.

In addition, in the magnetic tape system 10 according to the present embodiment, the pair of first servo reading elements SRa and the pair of second servo reading elements SRb are shifted from each other by the predetermined difference Dr along the second direction WD2, and the predetermined difference Dr is longer than the pitch Tp. Therefore, even in a case in which the predetermined difference Dr is longer than the pitch Tp, in a case in which the data is recorded on the magnetic tape MT using the SMR method, the reading position of the servo pattern 52 read by the servo reading element SR can be aligned with the reading position of the servo pattern 52 during the reproduction of the data.

In addition, in the magnetic tape system 10 according to the present embodiment, one recording module DWM is disposed on each of both sides of the reproducing module DRM. Therefore, the data can be recorded on the magnetic tape MT using the SMR method from one side to the other side in the longitudinal direction LD, and the data can be recorded on the magnetic tape MT from the other side to one side in the longitudinal direction LD. Even in a case in which the data is recorded on the magnetic tape MT using the SMR method from one side to the other side in the longitudinal direction LD, or even in a case in which the data is recorded on the magnetic tape MT from the other side to one side in the longitudinal direction LD, the data can be reproduced from the plurality of divided data tracks DT_N by using the data reproducing element DR.

In the above-described embodiment, although an example of the form in which the center position of the data recording element DW included in the data recording/reproducing element DRW corresponding to one data track DT and the center position of the data reproducing element DR align with each other in the width direction WD in the magnetic head 28 on the magnetic tape MT has been described, the technology of the present disclosure is not limited to this. For example, the center position of the data recording element DW included in the data recording/reproducing element DRW corresponding to one data track DT and the center position of the data reproducing element DR may be shifted from each other in the width direction WD. In this case, the predetermined difference Dr need only be adjusted by a shift amount by which the center position of the data recording element DW included in the data recording/ reproducing element DRW corresponding to one data track DT and the center position of the data reproducing element DR are shifted from each other.

In the above-described embodiment, a case in which the predetermined difference Dr is longer than the pitch Tp has been described as an example, but the technology of the present disclosure is not limited to this, and the predetermined difference Dr may be the same as the pitch Tp, or the predetermined difference Dr may be less than the pitch Tp.

By the way, in recent years, research on a technology for reducing the influence of TDS has been advanced. It has been known that the TDS is affected by a temperature, humidity, a pressure at which the magnetic tape is wound around the reel, temporal deterioration, or the like, the TDS is increased in a case where no measures are taken, and off-tracking (that is, misregistration of the data recording/reproducing element DRW with respect to the divided data track DT_N in the data band DB) occurs in a scene in which the magnetic processing is performed on the data band DB.

For example, in a case in which the width of the magnetic tape MT contracts with passage of time, there is concern that the off-tracking may occur. The off-tracking refers to a state in which the data recording/reproducing element DRW is not positioned on the designated divided data track DT_N among the divided data tracks DT1_1, DT1_2, DT1_3, DT1_4, . . . , DT1_11, and DT1_12 included in the divided data track group DTG (that is, a state in which the position of the designated divided data track DT_N and the position of the data recording/reproducing element DRW are shifted from each other in the width direction WD).

In some cases, the width of the magnetic tape MT expands, and the off-tracking may occur in such cases as well. That is, in a case in which the width of the magnetic tape MT contracts or expands with the elapse of time, the position of the servo reading element SR with respect to the servo pattern 52 diverges in the width direction WD from a predetermined position (that is, a predetermined position determined in design with respect to each of the linear magnetization regions 54A1, 54A2, 54B1, and 54B2) determined in design. In a case in which the position of the servo reading element SR with respect to the servo pattern 52 diverges from the predetermined position determined by the design in the width direction WD, the accuracy of the servo control is deteriorated, and the position of the track (for example, the designated divided data track DT_N among the divided data tracks DT1_1, DT1_2, DT1_3, DT1_4, . . . , DT1_11, and DT1_12) in the data band DB and the position of the data recording/reproducing element DRW deviate from each other. Then, an originally scheduled divided data track DT_N will not be subjected to the magnetic processing.

As a method of reducing the influence of the TDS, a method of adjusting the width of the magnetic tape MT by adjusting the tension applied to the magnetic tape MT is considered. However, in a case in which an amount of deformation of the magnetic tape MT in the width direction WD is too large, the off-tracking may not be eliminated even in a case in which the tension applied to the magnetic tape MT is adjusted. In addition, in a case in which the tension applied to the magnetic tape MT is increased, the load applied to the magnetic tape MT is also increased, which may lead to shortening the life of the magnetic tape MT. Further, in a case where the tension applied to the magnetic tape MT is too weak, the contact state between the magnetic head 28 and the magnetic tape MT is unstable, and it is difficult for the magnetic head 28 to perform the magnetic processing on the magnetic tape MT. As a method of reducing the influence of the TDS other than the method of adjusting the tension applied to the magnetic tape MT, as shown in FIG. 19 as an example, a method of holding the position of the servo reading element SR with respect to the servo pattern 52 at the predetermined position determined in design by skewing the magnetic head 28 on the magnetic tape MT is known.

Figure 19:
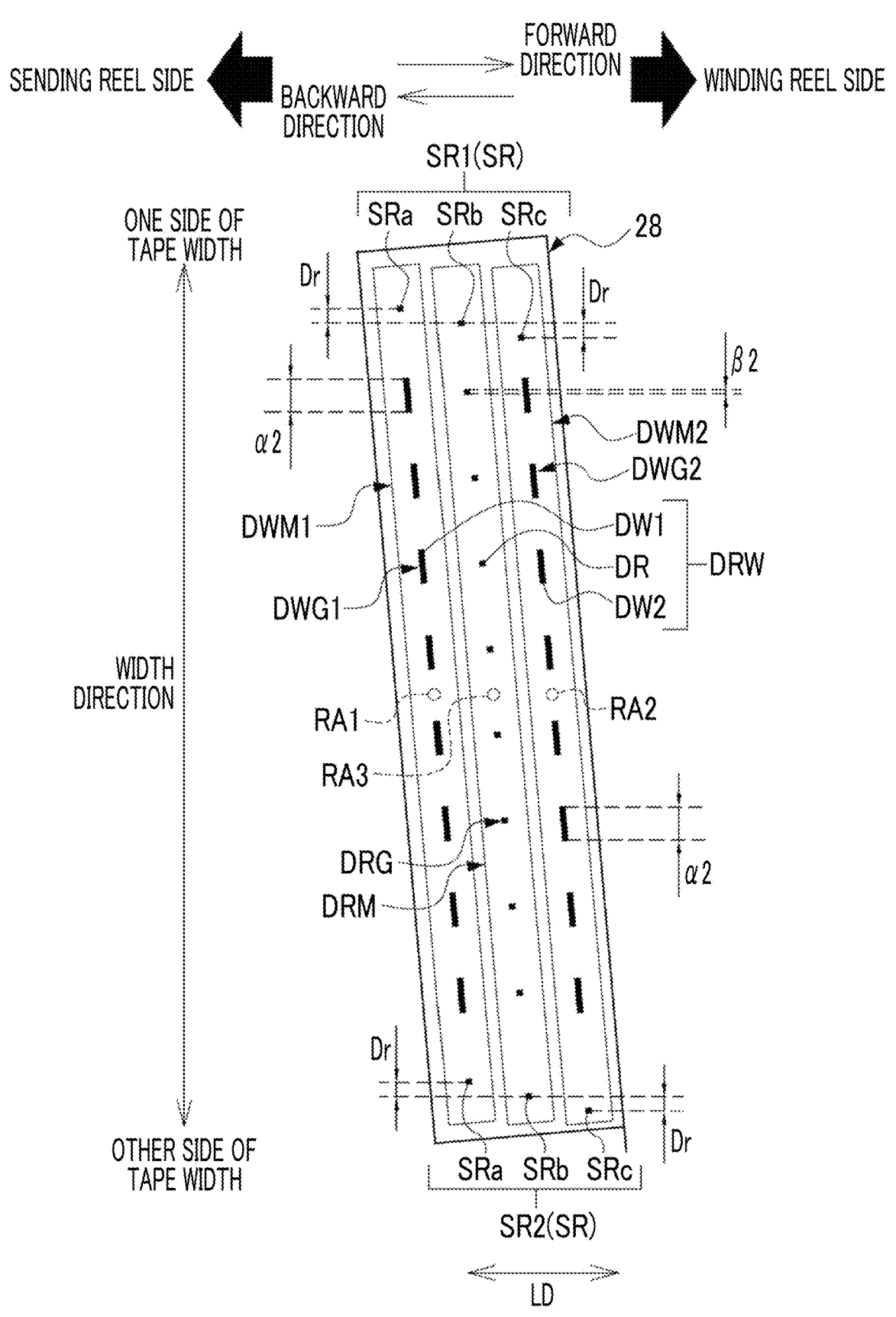
FIG. 19 is a conceptual diagram showing a second modification example of the configuration of the magnetic head.

Therefore, as shown in FIG. 19 as an example, the first recording module DWM1 may be disposed in a posture inclined with respect to the width direction WD along the front surface 31 of the magnetic tape MT with the rotation axis RA1 as a center. In addition, the reproducing module DRM may be disposed in a posture inclined with respect to the width direction WD along the front surface 31 of the magnetic tape MT with the rotation axis RA2 as a center. Further, the second recording module DWM2 may be disposed in a posture inclined with respect to the width direction WD along the front surface 31 of the magnetic tape MT with the rotation axis RA3 as a center.

In the example shown in FIG. 19, a length $\alpha2$, which is a length of each of the data recording elements DW included in the recording module DW in the width direction WD, is the same as the length $\alpha1$ (see FIG. 11) described above. In addition, in the example shown in FIG. 19, the length $\beta2$, which is the length of each of the data reproducing elements DR included in the reproducing module DRM in the width direction WD, is the same as the length $\beta1$ (see FIG. 11) described above.

The postures of the first recording module DWM1, the reproducing module DRM, and the second recording module DWM2 with respect to the width direction WD may be fixed or may be changed according to a situation (for example, a degree of deformation of the magnetic tape MT). In a case of changing the postures of the first recording module DWM1, the reproducing module DRM, and the second recording module DWM2 with respect to the width direction WD, an inclination mechanism (not shown) that operates under the control of the processing device 30 is used. The inclination mechanism is mechanically connected to the first recording module DWM1, the reproducing module DRM, and the second recording module DWM2. In this case, a degree of inclination of the first recording module DWM1, the reproducing module DRM, and the second recording module DWM2 with respect to the width direction WD is adjusted by the inclination mechanism under the control of the processing device 30 according to the situation.

For example, the adjustment of the degree of inclination of the first recording module DWM1, the reproducing module DRM, and the second recording module DWM2 with respect to the width direction WD is realized by rotating the first recording module DWM1 along the front surface 31 on the front surface 31 with the rotation axis RA1 as a central axis, rotating the reproducing module DRM along the front surface 31 on the front surface 31 with the rotation axis RA2 as a central axis, and rotating the second recording module DWM2 along the front surface 31 on the front surface 31 with the rotation axis RA3 as a central axis.

Here, although an example of a form in which the first recording module DWM1, the reproducing module DRM, and the second recording module DWM2 are individually controlled to rotate by the inclination mechanism has been described, this is merely an example, and the entire magnetic head 28 may be rotated by one inclination mechanism with the rotation axis RA2 as a central axis.

As described above, by disposing the recording module DWM and the reproducing module DRM in a posture inclined with respect to the width direction WD along the front surface 31 of the magnetic tape MT, it is possible to suppress the decrease in the accuracy of the tracking control of the magnetic head 28 with respect to the magnetic tape MT due to the deformation of the magnetic tape MT. For example, it is possible to suppress the occurrence of a situation in which data is not recorded at a scheduled position or data cannot be reproduced from the scheduled position due to the deformation of the magnetic tape MT.

In the above-described embodiment, the magnetic tape system 10 has been described in which the magnetic tape cartridge 12 can be inserted and removed with respect to the magnetic tape drive 14, but the technology of the present disclosure is not limited to this. The technology of present disclosure is established even to, for example, a magnetic tape system in which at least one magnetic tape cartridge 12 is loaded in advance into the magnetic tape drive 14 (that is, a magnetic tape system in which at least one magnetic tape cartridge 12 and the magnetic tape drive 14, or the magnetic tape MT and the magnetic tape drive 14 are integrated in advance (for example, before data is recorded on a data band DB)).

In the above-described embodiment, the single magnetic head 28 has been described, but the technology of the present disclosure is not limited to this. For example, a plurality of magnetic heads 28 may be disposed on the magnetic tape MT.

The above-described contents and shown contents are the detailed description of the parts according to the technology of the present disclosure, and are merely examples of the technology of the present disclosure. For example, description related to the above configurations, functions, actions, and effects is description related to an example of configurations, functions, actions, and effects of the parts relating to the technology of the present disclosure. Thus, it is needless to say that unnecessary parts may be deleted, new elements may be added, or replacement may be made to the content of the above description and the content of the drawings without departing from the gist of the technology of the present disclosure. In addition, in order to avoid complications and facilitate understanding of the parts according to the technology of the present disclosure, in the above-described contents and shown contents, the description of common technical knowledge and the like that do not particularly require description for enabling the implementation of the technology of the present disclosure are omitted.

In the present specification, "A and/or B" is synonymous with "at least one of A or B". That is, "A and/or B" may refer to A alone, B alone, or a combination of A and B. In addition, in the present specification, in a case in which three or more matters are associated and expressed by "and/or", the same concept as "A and/or B" is applied.

All documents, patent applications, and technical standards mentioned in the present specification are incorporated herein by reference to the same extent as in a case in which each document, each patent application, and each technical standard are specifically and individually described by being incorporated by reference.

What is claimed is:

1. A magnetic head provided with a plurality of servo reading elements corresponding to a plurality of servo bands in which a plurality of servo patterns are recorded along a longitudinal direction of a magnetic tape and performing recording of data on the magnetic tape and reproducing of the data from the magnetic tape, the magnetic head comprising:

a recording module in which a plurality of recording elements are provided between a pair of first servo reading elements adjacent to each other in a width direction of the magnetic tape among the plurality of servo reading elements; and a reproducing module in which a plurality of reproducing elements are provided between a pair of second servo reading elements adjacent to each other in the width direction among the plurality of servo reading elements, wherein the recording module and the reproducing module are disposed along the longitudinal direction, the pair of first servo reading elements and the pair of second servo reading elements are shifted from each other by a predetermined difference in one direction of the width direction, and the predetermined difference is defined based on a pitch between a plurality of tracks formed by recording the data on the magnetic tape by the recording element using an SMR method and a length of the recording element in the width direction.

2. The magnetic head according to claim 1,
wherein a center position of the recording element aligns with a center position of the reproducing element in the width direction in the magnetic head on the magnetic tape.

3. The magnetic head according to claim 1,
wherein a first length that is a length of the recording element in the width direction is longer than a second length that is a length of the reproducing element in the width direction, and the second length is equal to or shorter than the pitch.

4. The magnetic head according to claim 3,
wherein the first length is equal to or longer than twice the pitch, and the second length is equal to or shorter than half the pitch.

5. The magnetic head according to claim 1,
wherein the one direction is a direction in which the data is shifted on the magnetic tape by recording the data on the magnetic tape using the SMR method.

6. The magnetic head according to claim 1,
wherein the predetermined difference is longer than the pitch.

7. The magnetic head according to claim 1,
wherein one recording module is disposed on each of both sides of the reproducing module in the longitudinal direction.

8. The magnetic head according to claim 1,
wherein the recording module and the reproducing module are disposed in a posture inclined with respect to the width direction along a recording surface of the magnetic tape.

9. A magnetic tape drive comprising:
the magnetic head according to claim 1; and
a processor that controls the magnetic head.

10. A magnetic tape comprising:
a plurality of servo patterns read by the plurality of servo reading elements included in the magnetic head according to claim 1; and
a plurality of tracks formed by recording the data by the recording element included in the magnetic head using an SMR method, based on a reading result of the plurality of servo patterns by the plurality of servo reading elements,
wherein the data is reproduced from the track by the reproducing element included in the magnetic head based on the reading result.

11. A magnetic tape cartridge comprising:
the magnetic tape according to claim 10; and
a case in which the magnetic tape is accommodated.

12. A magnetic tape system comprising:
a magnetic tape drive including the magnetic head according to claim 1 and a processor that controls the magnetic head; and
a magnetic tape including a plurality of servo patterns read by the plurality of servo reading elements included in the magnetic head and a plurality of tracks formed by recording the data by the recording elements included in the magnetic head using an SMR method, based on a reading result of the plurality of servo patterns by the plurality of servo reading elements, and in which the data is reproduced from the track by the reproducing element included in the magnetic head based on the reading result.

\* \* \* \* \*